(12) United States Patent
Ijaz et al.

(10) Patent No.: US 8,475,954 B2
(45) Date of Patent: Jul. 2, 2013

(54) FLEXIBLE VOLTAGE NESTED BATTERY MODULE DESIGN

(75) Inventors: Mujeeb Ijaz, Leonard, MI (US); Brian D. Rutkowski, Ypsilanti, MI (US); Shazad Butt, Troy, MI (US); Jonathan Hostler, Canton, MI (US); Brian Moorhead, Willis, MI (US)

(73) Assignee: A123 Systems, LLC, Waltham, MA (US)

( * ) Notice: Subject to any disclaimer, the term of this patent is extended or adjusted under 35 U.S.C. 154(b) by 958 days.

(21) Appl. No.: 12/423,799

(22) Filed: Apr. 14, 2009

(65) Prior Publication Data

US 2009/0297892 A1 Dec. 3, 2009

Related U.S. Application Data

(60) Provisional application No. 61/044,784, filed on Apr. 14, 2008.

(51) Int. Cl.
  *H01M 2/26* (2006.01)
(52) U.S. Cl.
  USPC .......................................... 429/160; 429/151
(58) Field of Classification Search
  None
  See application file for complete search history.

(56) References Cited

U.S. PATENT DOCUMENTS

| | | | |
|---|---|---|---|
| 4,347,294 A | 8/1982 | Mejia | |
| 5,968,672 A | 10/1999 | Mitsuyoshi et al. | |
| 6,309,776 B1 | 10/2001 | Okajima et al. | |
| 6,340,877 B1 * | 1/2002 | Mita et al. | 320/112 |
| 2003/0213121 A1 * | 11/2003 | Rouillard et al. | 29/623.2 |
| 2005/0079408 A1 * | 4/2005 | Hirano | 429/82 |
| 2006/0267545 A1 * | 11/2006 | Lee et al. | 320/106 |
| 2007/0009787 A1 | 1/2007 | Straubel et al. | |
| 2007/0122692 A1 * | 5/2007 | Smith et al. | 429/87 |

OTHER PUBLICATIONS

International Search Report and Written Opinion issued for PCT/US2009/040583, dated Jan. 7, 2010 (11 pages).
European Search Report for European Patent Application No. 09767167.1 mailed Jan. 25, 2013. 9 pages.
No Author Listed. "Nd:YAG Laser Welding Guide." Unitek Miyachi Corporation. Monrovia, California. 2003 (No Month Listed). XP55034843. 18 pages.

\* cited by examiner

*Primary Examiner* — Ula C Ruddock
*Assistant Examiner* — Daniel Gatewood
(74) *Attorney, Agent, or Firm* — Wilmer Cutler Pickering Hale and Dorr LLP

(57) ABSTRACT

Exemplary embodiments of the present invention provide flexible, multi-voltage battery modules having multiple cells that are nested together. The cells can be, for example, cylindrical lithium ion cells. To increase cell package density, the cells can be disposed in a nested configuration so that adjacent cell centers form equilateral triangles. The cells can be placed in a housing or case with interlocking tabs that allow multiple modules to be connected together. Within a module, the cells can be connected in different configurations by buss bars at the top and the bottom of the battery cells. The different configurations may provide different voltages for the module.

16 Claims, 36 Drawing Sheets

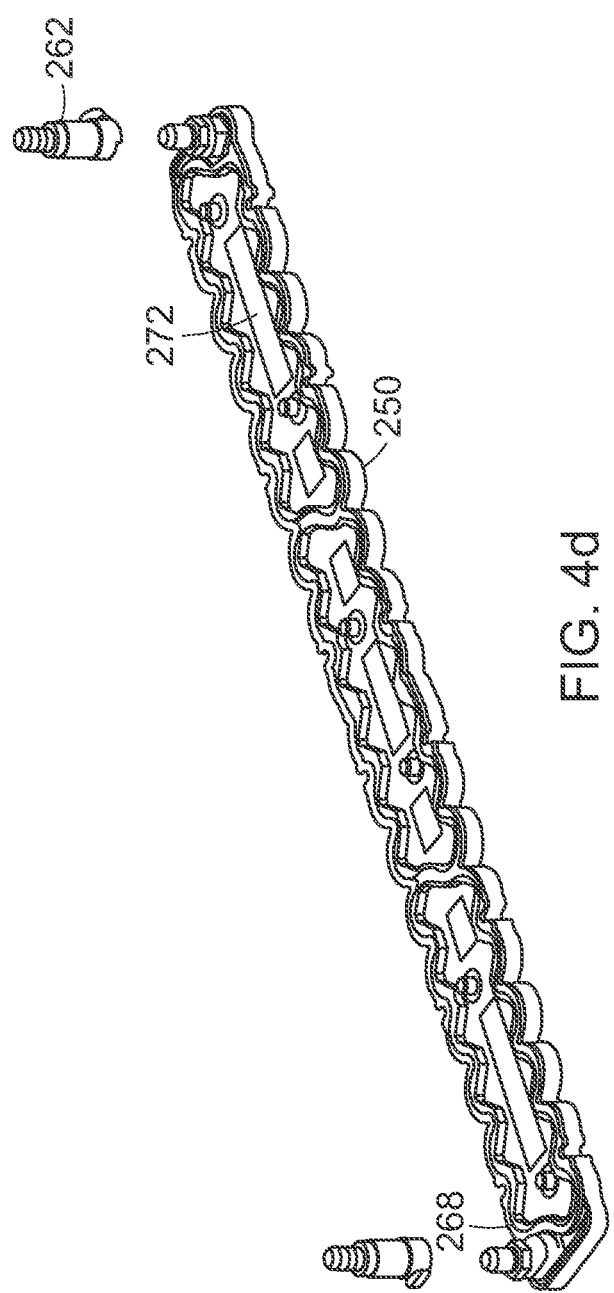

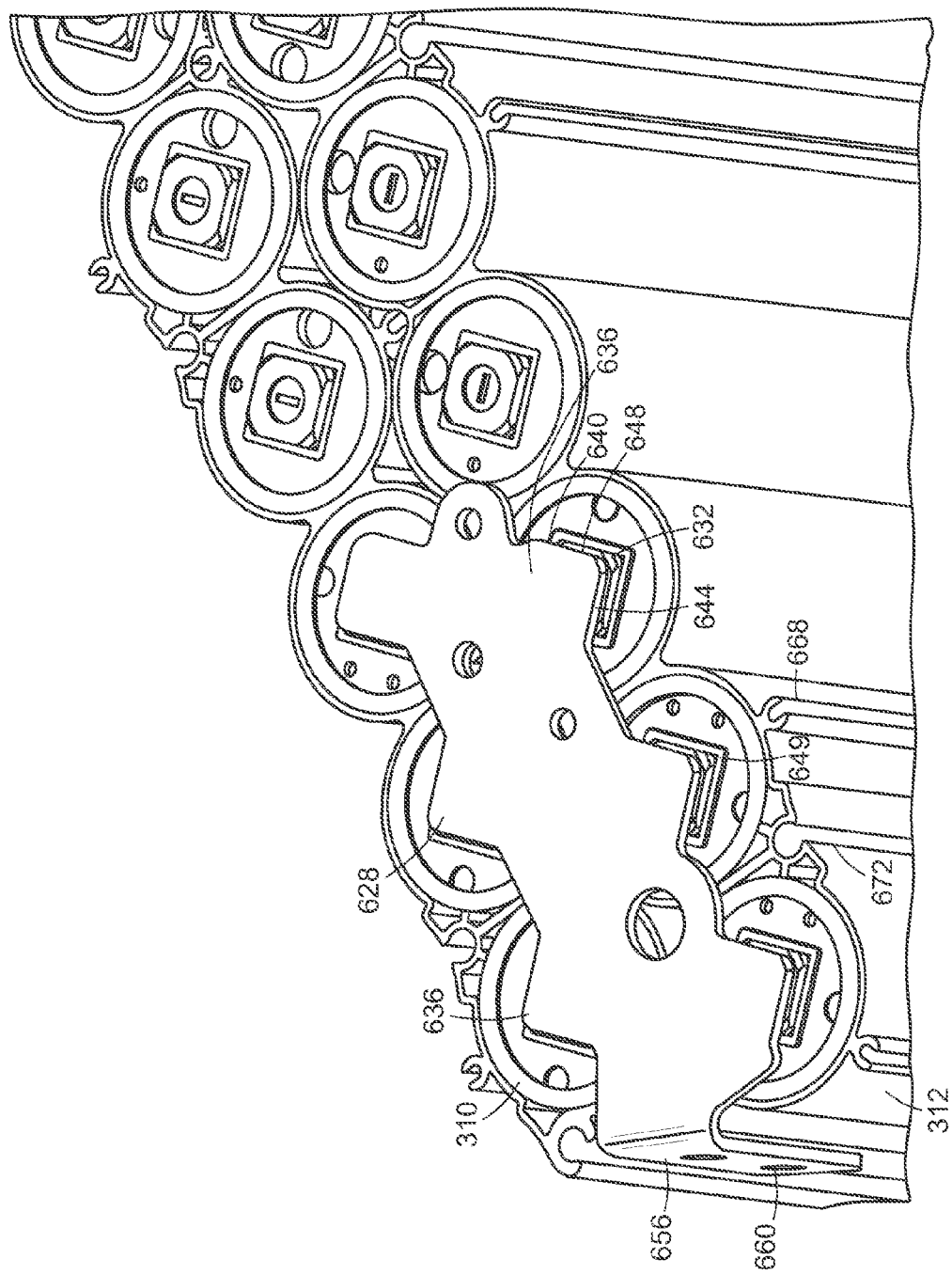

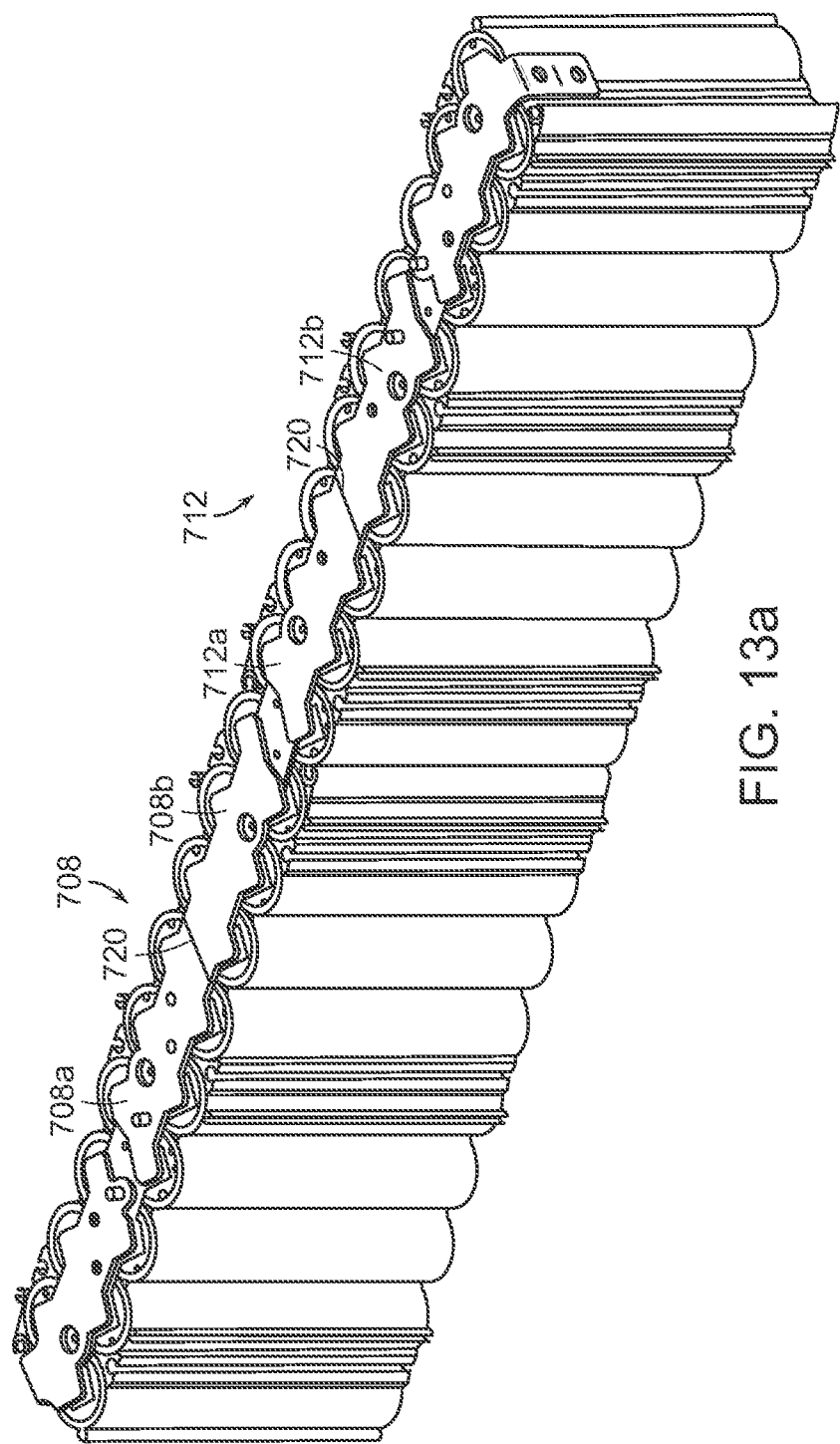

FLEXIBLE VOLTAGE NESTED BATTERY MODULE DESIGN

CROSS-REFERENCE

This application is a non-provisional application of U.S. Provisional Application No. 61/044,784, filed Apr. 14, 2008.

FIELD OF THE INVENTION

Exemplary embodiments consistent with the present invention generally relate to a battery module design, and more particularly, to a flexible voltage nested battery module having multiple electrochemical battery cells.

BACKGROUND

A battery module can include multiple electrochemical cells that are grouped together. The cells can be, for example, cylindrical lithium ion cells each having two power terminals (a positive terminal and a negative terminal) disposed at two opposite ends of the cell. The two power terminals are typically made from different materials. For example, the power terminals are often made of aluminum (positive) and copper (negative) or nickel coated steel (negative).

FIG. 1 is a top view of a battery module 102 having cylindrical cells 104 that are disposed in a matrix configuration with spaces 106 between the cells 104. Battery modules, such as module 102, are inflexible in the sense that each module can only provide a single voltage. To provide different voltages, multiple conventional battery modules have to be connected in series, resulting in an increased battery size. Also, the package density of the cells shown in FIG. 1 is not optimal.

Conventional battery modules lack a robust configuration with respect to how the cylindrical cells 104 are mechanically and electrically coupled to surrounding elements. Further, conventional battery modules have suffered from insufficient heat removal and an inability to effectively couple together multiple individual modules. Hence, a battery module that is easy to manufacture and provides an increased cell package density is desirable.

SUMMARY OF THE NON-LIMITING EMBODIMENTS OF THE INVENTION

Exemplary embodiments of the present invention provide flexible, multi-voltage battery modules having multiple cells that are nested together. The cells can be, for example, cylindrical lithium ion cells. To increase cell package density, the cells can be disposed in a nested configuration so that adjacent cell centers form equilateral triangles. The cells can be placed in a housing or case (e.g., a plastic housing) with interlocking tabs that allow multiple modules to be connected together. Within a module, the cells can be connected in different configurations by buss bars at the top and the bottom of the battery cells. The different configurations may provide different voltages for the module. The buss bars can include two portions made by different materials (e.g., an aluminum portion and a copper portion) that are welded together. A battery module can include heat sinks at one end or both ends for cooling the battery module via the buss bars.

Exemplary embodiments of the present invention also provide battery modules having a cell vent ducting design that cools and redirects hot and high velocity gasses without adding extra components to the module. In a battery module, battery cells can have cell vents located between the edges of the metallic buss bars. The buss bars can be cooled by a liquid cooling system, and can be used to reduce the temperature and velocity of gas released from the cell vents.

In an exemplary embodiment, a battery module is provided that comprises a cell casing. A plurality of battery cells are disposed within the cell casing, the battery cells respectively have terminals, the terminals having top and peripheral sides portions. At least one buss bar segment provides an electrical connection between a group of the battery cells and is extended across longitudinal ends of the group of battery cells to contact the tops of the terminals. Peripheral sides of the terminals are unobstructed by the buss bar segments such that a laser can be pointed toward the peripheral sides to weld the terminals to the buss bar segment.

In an aspect, the battery cells have terminals that comprise at least two peripheral sides, and the buss bar segment comprises protrusions that contact the terminals. The protrusions have a first side and a second side that are aligned with the at least two peripheral sides of the terminals. In other aspect, a plurality of buss bar segments are provided, each of the plurality of buss bar segments being spaced from each other in a direction extending along a row of the battery cells.

In an aspect, the cell casing comprises an interlocking mechanism which is operative to couple the cell casing to an adjacent cell casing. The interlocking mechanism may comprise at least one of a tab and a slot. In a further aspect, the interlocking mechanism comprises a tab and a slot for respectively engaging with a slot and a tab of the adjacent cell casing.

In an aspect, the group of battery cells comprises at least a first and second row, and the terminals have a circumferential shape with a plurality of corners, such that one of the corners of the terminals in the first row points away from the second row, and one of the corners of the terminals in the second row points away from the first row. The terminals may have a square circumferential shape.

In a further aspect, the battery module comprises a printed circuit board that monitors at least one of voltage and temperature of the battery module. The battery module may also include a cover, wherein the printed circuit board extends along the plurality of buss bar segments between the cover and the plurality of buss bar segments.

In another aspect, the plurality of buss bar segments form a first buss bar configuration at the longitudinal ends of the battery cells, and the battery module comprises a second plurality of buss bar segments at another longitudinal end of the battery cells to form a second buss bar configuration. The first buss bar configuration may have a greater number of segments than the second buss bar configuration. In an even further aspect, a heat sink is provided that cools the second buss bar configuration. The heat sink extends along the second buss bar configuration and comprises coolant inlets and outlets.

In accordance with an exemplary embodiment, a battery module configuration comprises a plurality of cell casings, each of the cell casings comprising a plurality of openings. A plurality of battery cells are disposed within the plurality of openings, and each of the cell casings have an interlocking mechanism which is operative to couple the cell casings together, the interlocking mechanisms being disposed on sides of the cell casings.

According to an aspect, the interlocking mechanisms comprise at least one of a tab and a slot. The interlocking mechanism of one of the cell casings may comprise a tab and a slot for respectively engaging with a slot and a tab of another of the cell casings.

In another aspect of the battery module, the battery cells respectively have terminals, and at least one buss bar segment provides an electrical connection between a group of the battery cells in a first of the cell casings, and at least one other buss bar segment provides an electrical connection between a group of the battery cells in a second of the cell casings. The terminals comprise at least two peripheral sides, and the buss bar segments comprise protrusions that contact the terminals, the protrusions having a first side and a second side that are aligned with the at least two peripheral sides of the terminals.

In a further aspect, a plurality of buss bar segments are provided for each of the cell casings, wherein the buss bar segments are spaced from each other. In another aspect, the groups of battery cells each comprise at least a first and second row of battery cells, and the terminals have a circumferential shape with a plurality of corners that are clocked such that two corners of each terminal point in opposite directions along the longitudinal directions, respectively, of the rows.

In accordance with a further exemplary embodiment of invention, a method of manufacturing a battery module is provided that includes placing a plurality of battery cells in an array, the plurality of battery cells respectively having a first longitudinal end with a terminal. A buss bar is disposed across the terminal of the battery cells and a laser is directed at the terminals in a direction that is substantially perpendicular to the longitudinal direction of the battery cells to establish a weld between the buss bar and the terminals.

In an aspect, the terminals comprise at least two peripheral sides, and the buss bar comprises protrusions that contact the terminals, the protrusions having a first side and a second side that are aligned with the at least two peripheral sides of the terminals, and the laser being applied in a direction along the at least two peripheral sides of the terminals to create the weld.

In another aspect, the plurality of battery cells are disposed in a first cell casing before the operation of directing the laser, the cell casing having a plurality of slots for holding the battery cells. In a further aspect, a second cell casing is provided that is coupled to the first cell casing using a coupling mechanism on sides of the first and second cell casings. In another aspect, a heat sink is provided in the first cell casing that is operative to extract heat from a second longitudinal end of the battery cells.

Exemplary embodiments of the present invention also provide intrinsically safe and compact fusing for battery modules. In a battery module, a fuse can be applied to each cell, and the fuses can be located in a space between the nested cells. Alternatively, the fuses may be cut into the buss bar.

BRIEF DESCRIPTION OF THE DRAWINGS

Exemplary embodiments of the invention are described with reference to the following figures, which are provided for the purpose of illustration only, the full scope of the invention being set forth in the claims that follow.

FIGS. 4A-4D are exploded views of a cooling portion of a battery module according to one or more embodiments of the invention;

FIG. 5A is a perspective view of a battery module according to one or more embodiments of the invention;

FIG. 10B is an enlarged view of a portion of FIG. 10a;

FIG. 13A is a perspective view of a battery module according to one or more embodiments of the invention;

DETAILED DESCRIPTION OF NON-LIMITING EMBODIMENTS OF THE INVENTION

Aspects of the present invention provide flexible, multi-voltage battery modules having multiple cells that are nested together. According to various embodiments, battery cells in a module can be efficiently packaged and can provide different output voltages with different configurations. In addition, battery modules may be packaged together using an interlocking mechanism. Exemplary embodiments of the invention also provide battery cells that are welded to a buss bar in a manner that is efficient and robust.

Figure 1:
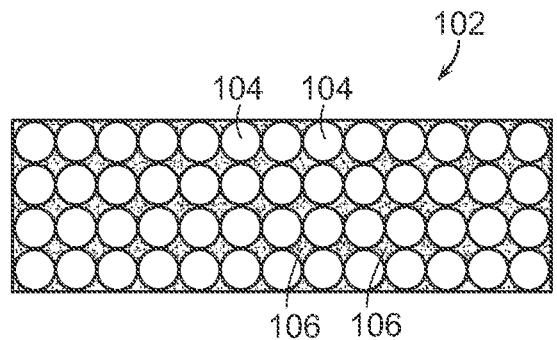
FIG. 1 is a top view of a battery module.
Figure 2:
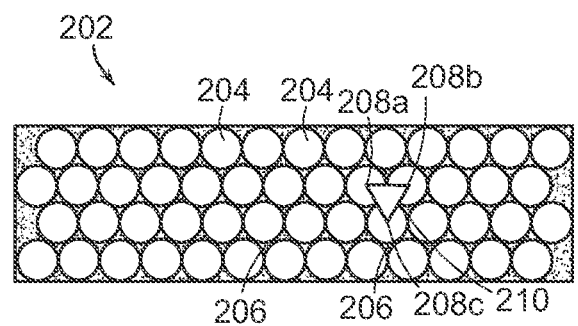
FIG. 2 is a top view illustrating a configuration of battery cells in a battery module according to one or more exemplary embodiments of the invention.

FIG. 2 is a top view illustrating a configuration of battery cells 204 in a battery module 202 according to one or more embodiments of the invention. As shown, the cells 204 are disposed in a nested manner such that the centers of adjacent cells (e.g., centers 208a, 208b, 208c) form equilateral triangles (e.g., triangle 210). In this way, the spaces 206 between the battery cells are minimized. Using this nested configuration, about 85%, for example, of the space within a module is occupied by battery cells.

Figure 3A:
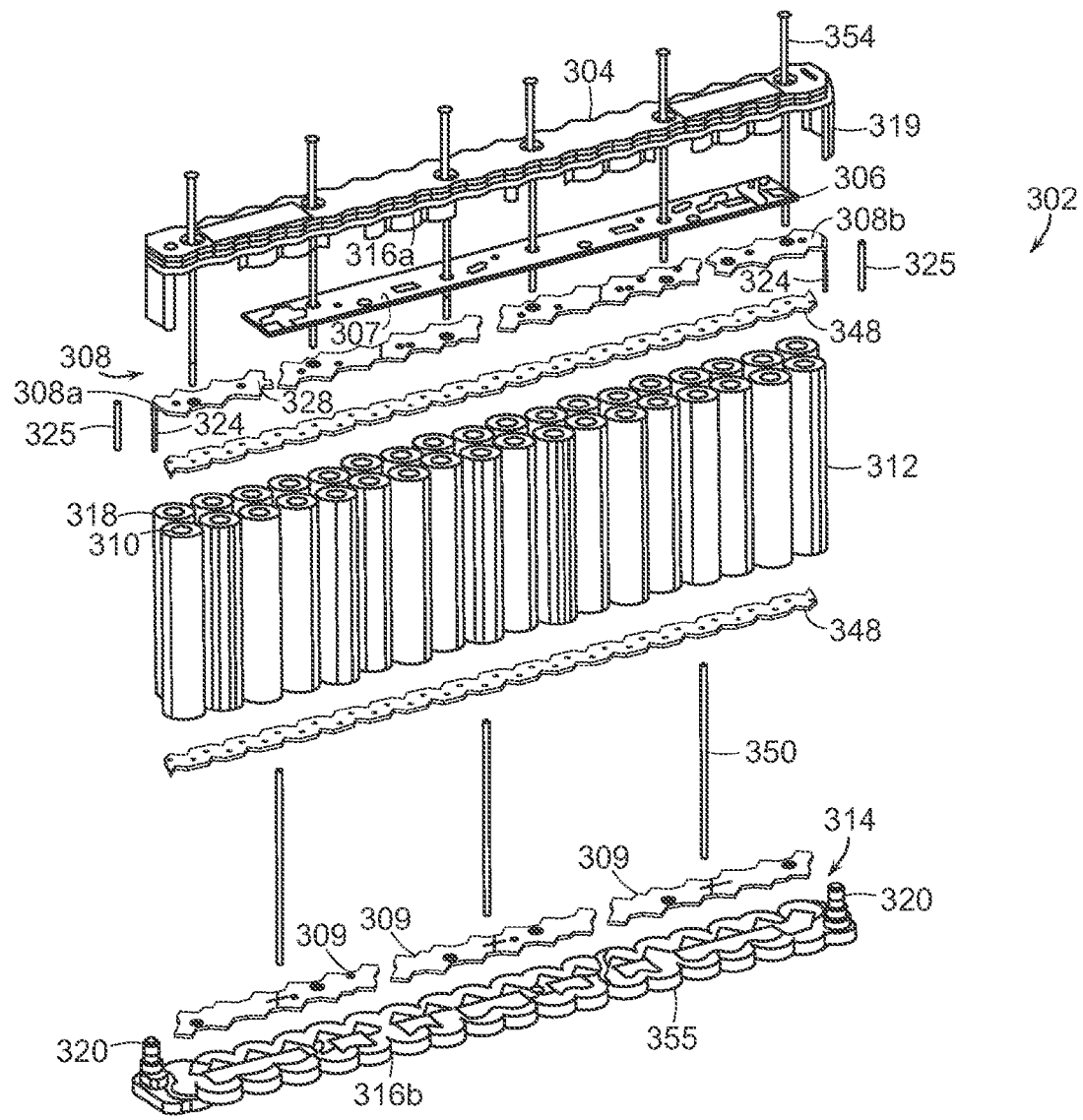
FIGS. 3A-3C are exploded views of a battery module according to one or more embodiments of the invention.
Figure 3B:
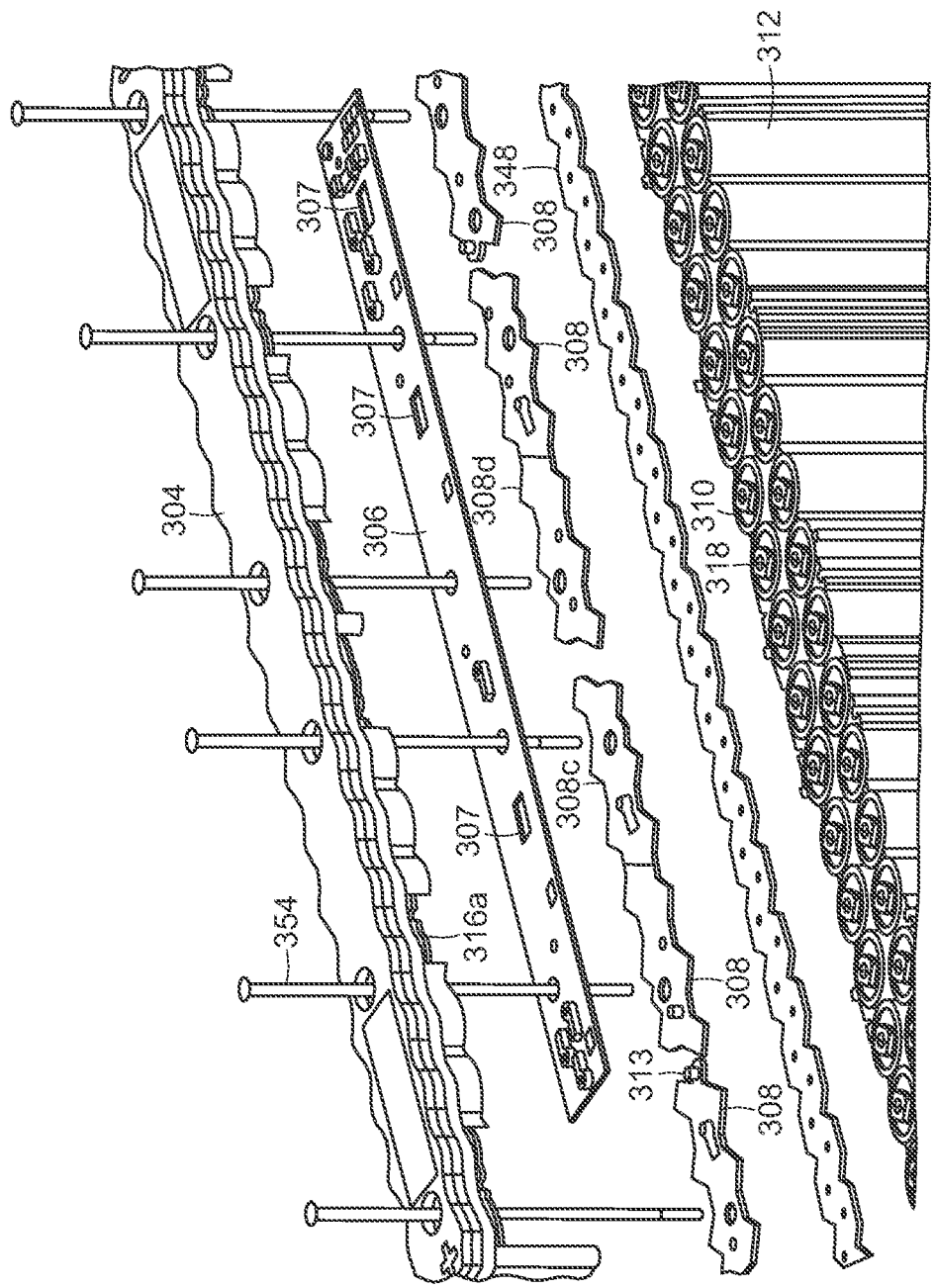
Figure 3C:
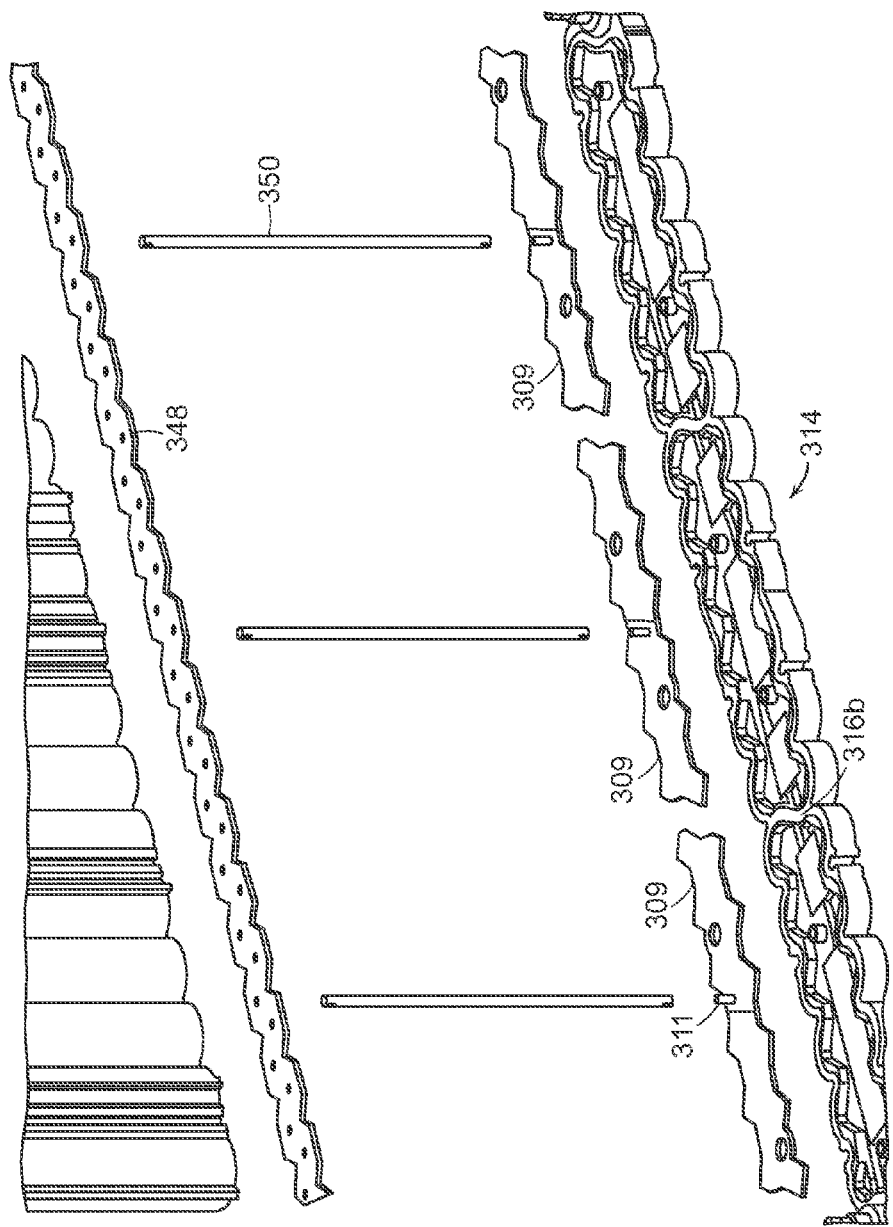
Figure 4A:
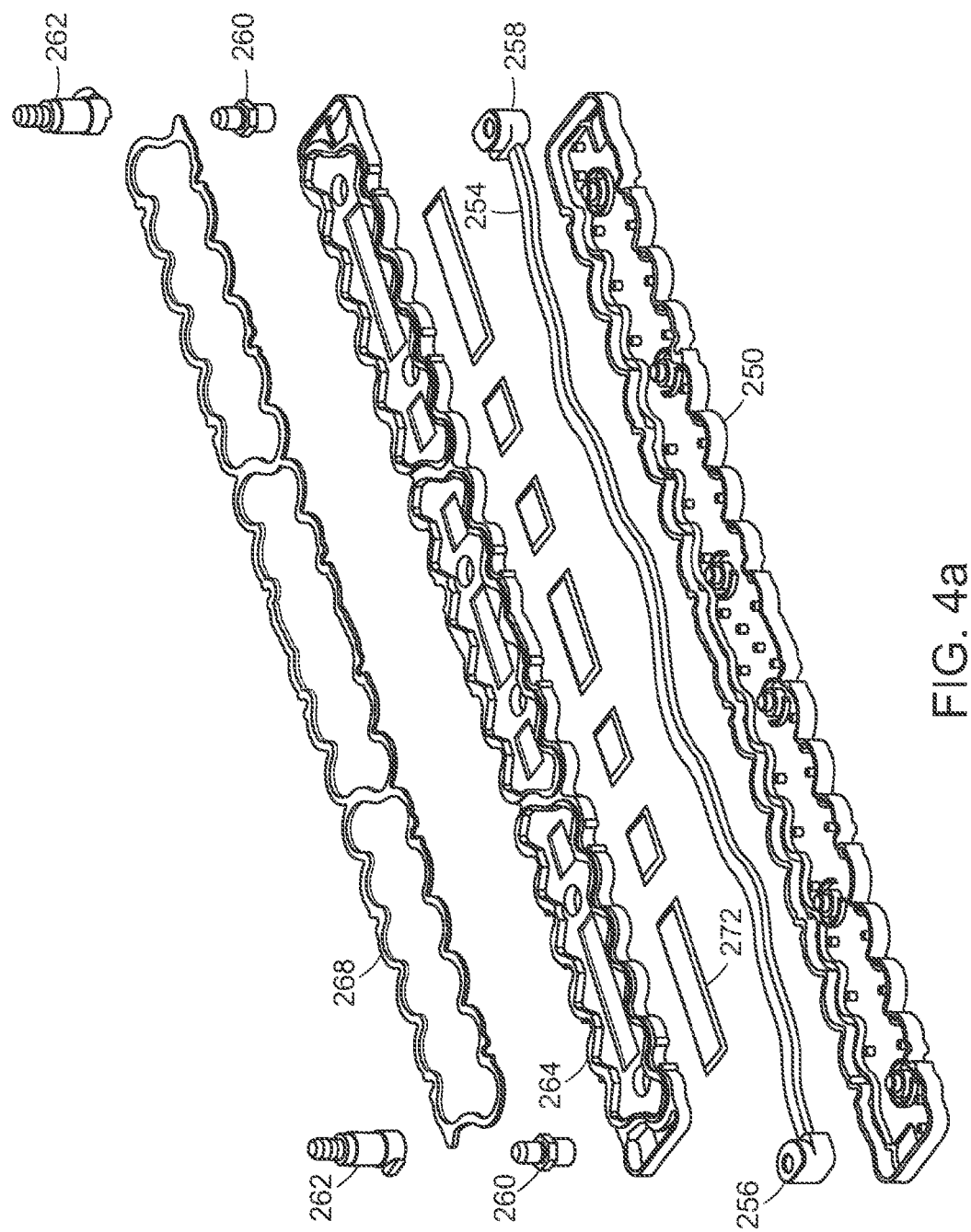
Figure 4B:
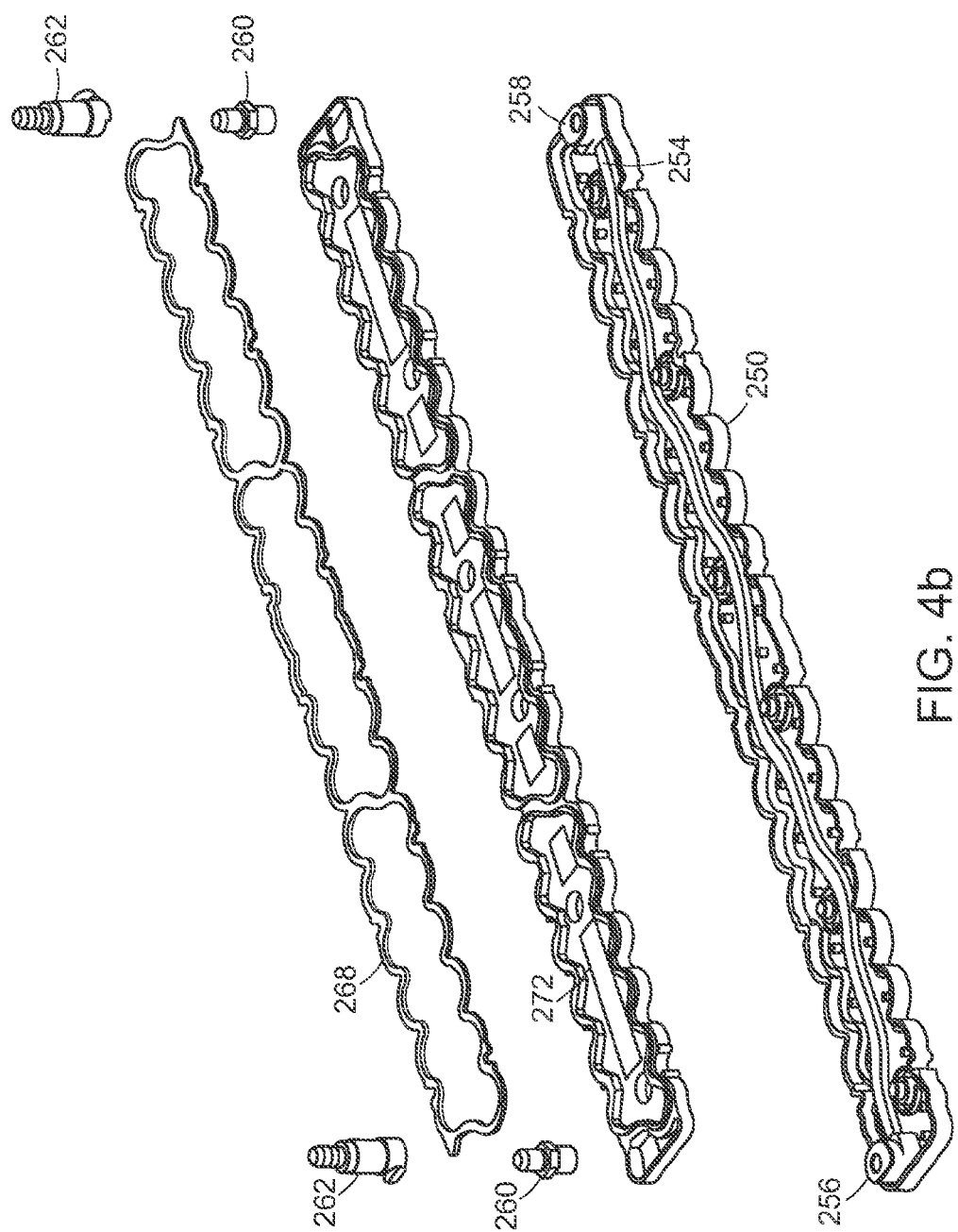
Figure 4C:
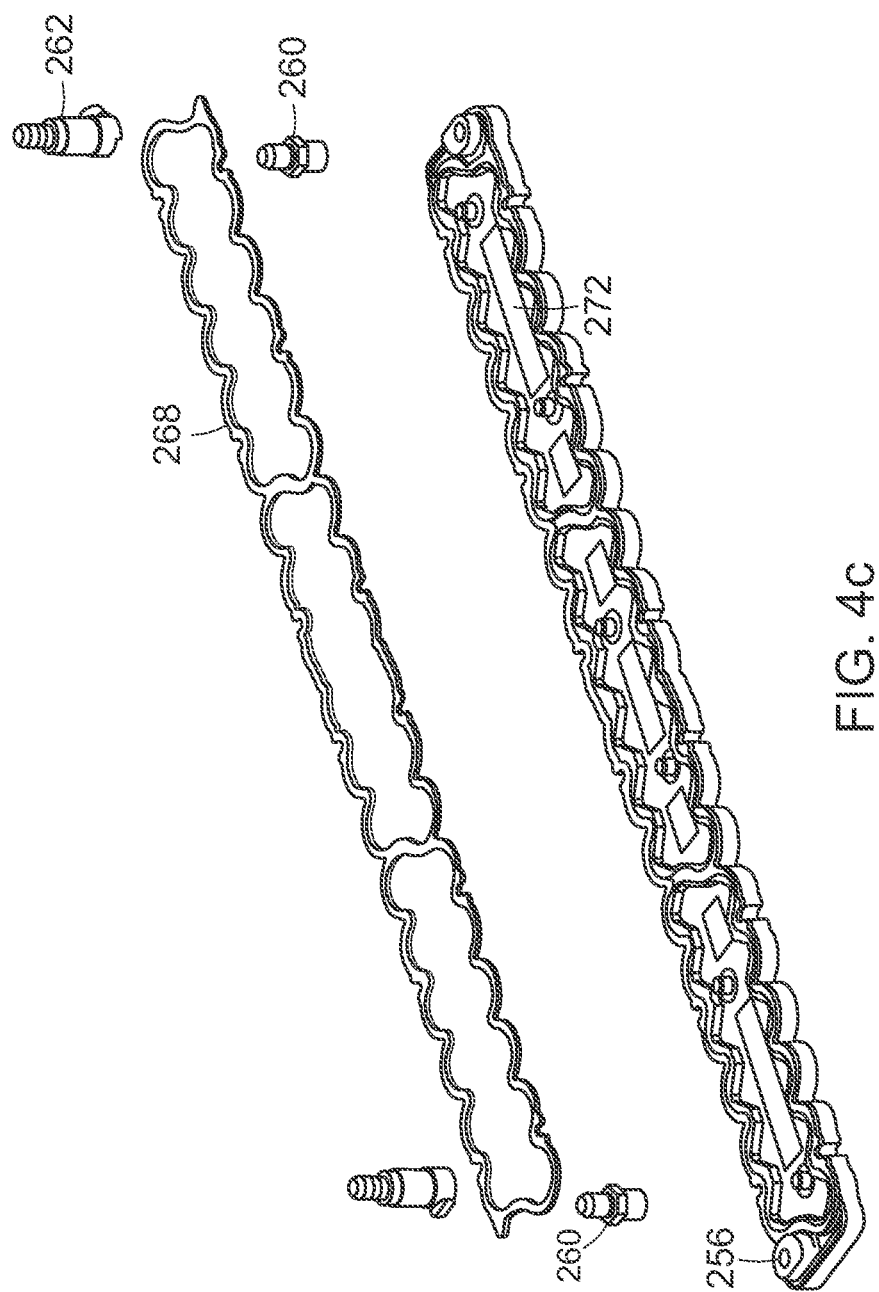

FIG. 3A is an exploded view of a battery module 302 according to one or more embodiments of the invention. FIGS. 3B and 3C are enlarged portions of FIG. 3A. The battery module 302 can include a cover 304, a voltage and temperature monitoring and balancing printed circuit board (PCB) 306, upper and lower high voltage (HV) buss bars 308, 309, a module cover seal 316a, a heat sink seal 316b, battery cells 310, a cell case (or housing) 312, and a liquid cooled heat sink 314.

Battery cells 310 can be, for example, cylindrical lithium ion cells. Buss bars 308 can include one or more electrically conducting materials. Cell case 312 can be made of plastic (e.g., polypropylene, thermally conductive Polytetrafluoroethylene (PTFE)) or any suitable material. Seals 316a, 316b can be made from any suitable non-conducting rubber material.

During assembly, battery cells 310 are placed inside the cell case 312, which has slots that can hold the cells 310 in a nested configuration as discussed above. The height of the cell case 312 is roughly the same as the height of the cells 310, so if cells of a different height are used to assemble the module 302, a cell case with a different height may be used. In addition to the flexibility of voltage discussed above, the design can support various lengths of cells by adjusting the cell height of 310 and the case height of 312 to be the same, thereby allowing for multiple amp-hour capacity as well as voltage from the same design. Buss bars 308, 309 can be fitted within the openings of the seals 316a, 316b, respectively, so that they are prevented from contacting each other and are electrically insulated. The buss bars 308, 309 are electrically coupled to positive and negative terminals, e.g., 318, of a number of cells 310.

The PCB 306 can be used to monitor and balance voltage, and monitor temperature of the battery module 302, and is protected by cover 304. In an exemplary embodiment, the module 302 has a single electronic control PCB 306, so as to reduce cost, mechanical complexity, electronic control complexity, and software control complexity. As shown in FIG. 3A, the PCB 306 is located above the four upper buss bars 308 and below the module's upper cover 304, which may be molded plastic.

In an embodiment, the PCB 306 does not extend the full length of the module 302, but still provides sufficient surface area to populate electronic devices required for electronic control functions of cell monitoring and balancing. The PCB of FIG. 3A has holes, which may be non-plated, to accommodate module structural screws or tie bolts 354, described below. The PCB 306 has ports 307 to accommodate buss bar thermistors that may be attached directly to the upper buss bars 308. The PCB 306 includes wires for interfacing with a host electronic control module.

Figure 7:
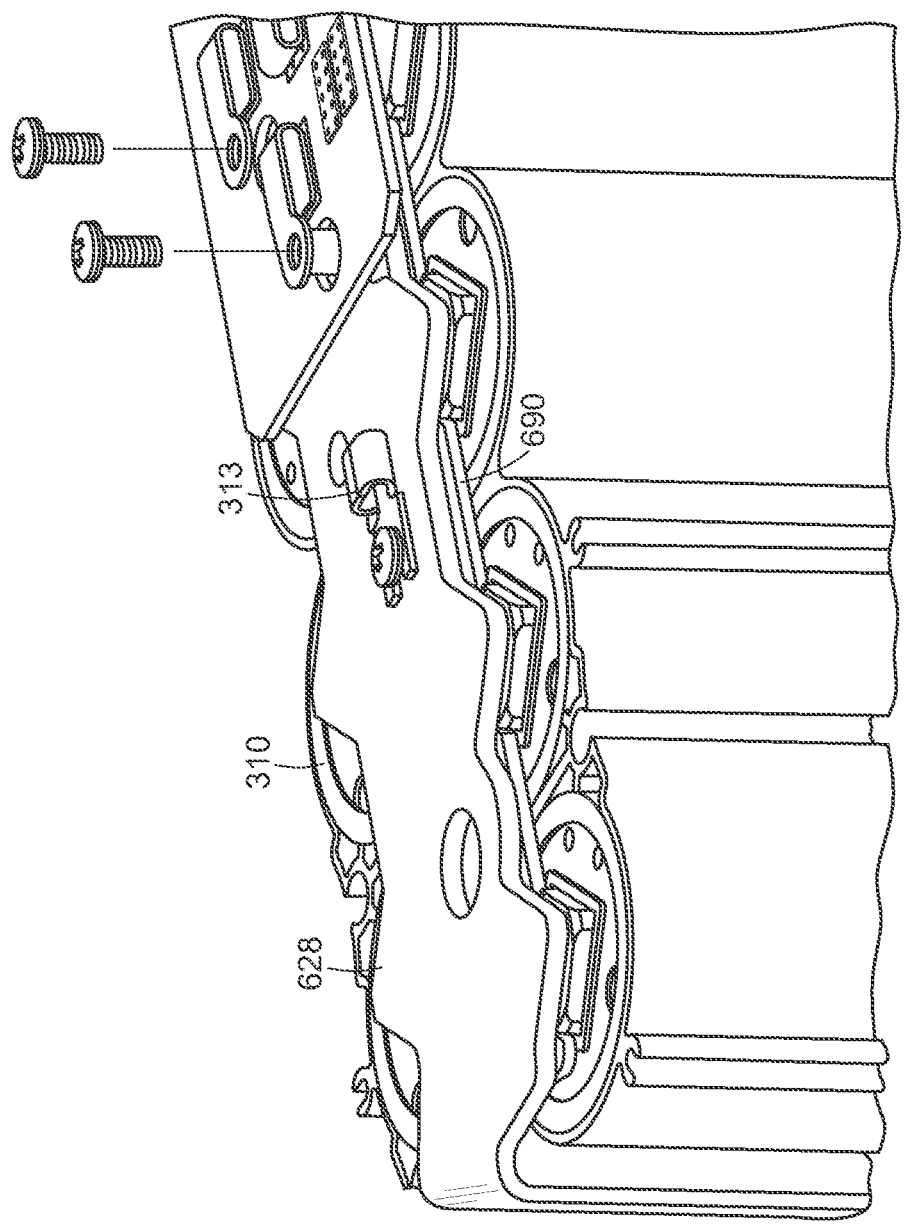
FIG. 7 is a perspective view of a battery module according to one or more embodiments of the invention.

An additional buss bar thermistor 313 can be attached to the upper buss bar 308 which does not intersect with the PCB's 306 profile, as shown for example in FIG. 7. The thermistor's 313 sensor is bonded inside a terminal and has flexible wire leads (not shown) that are soldered to adjacent copper pads on the PCB. The same configuration is used for the other three thermistors.

The buss bars 308 and 309 may be bi-metallic as discussed in more detail below. The embodiment of FIG. 3A includes three lower bi-metallic buss bars 309 with an externally-threaded stud 311 that is pressed into a hole and protrudes upwards. The upper buss bars may include positive aluminum upper buss bar 308a, negative copper upper buss bar 308b, and two upper bi-metallic buss bars 308c, 308d with an internally-threaded stud 313 that is pressed into a hole and protrudes upwards.

In some embodiments, upper buss bars 308a, 308b at the two opposite ends of the module 302 may each have an extension tab 324 that can be bent to extend along an outer portion of the cell casing 312. On the extension tab 324, there can be a hole or holes to electrically connect multiple battery modules, as will be explained in connection with FIGS. 17-20. In an exemplary embodiment, the cover 304 includes side shrouds 319 that may cover and hold the extension tabs 324 against the cell casing 312. Support elements 325 may be used behind the extension tabs 324 for providing support to the extension tabs 324. Positioning bars 348, as will be discussed further below, may be used to assist in rotationally positioning the cells 310. Voltage sensing rods 350 extend from the bottom buss bars 309 to the printed circuit board 306 for monitoring and detecting voltage. For example, the voltage sensing rods 350 may be in the form of rigid copper voltage sensing rods 350 with internal threads and wrench flats at each end. The rods 350 extend upwards so that an electrical connection can be made between the three lower bi-metallic buss bars 309 and the PCB 306. Tie screws or bolts 354 extend through the battery module and are fixed to the base 355.

As shown in FIGS. 4A-4D, the heat sink 314 may be liquid-cooled and comprise a subassembly with a base 250, which may be molded plastic, a tube 254 with a non-uniform profile to transport liquid, manifolds brazed or otherwise attached to the ends of the tube 254, liquid transport fittings 260, 262, a molded plastic cover 264, an elastomeric perimeter seal 316b to improve the module's environmental protection, and thermal transfer plates 272. The seal 316b is also shown in FIG. 3A and is similar to the seal 316a.

The thermal transfer plates 272 may be fabricated from a special thermally-conductive electrically-isolative plastic material. The plates can be bonded to ports in the heat sink's cover 264 with an adhesive. If this configuration is used, a dispensed thermal interface grease can be disposed between the plates 272 and the module's lower buss bars 309, shown in FIG. 3A, to ensure effective thermal transfer.

The thermal transfer plates 272 may also be fabricated from a thermally-conductive electrically-conductive aluminum material. The plates 272 can be bonded to ports in the heat sink's cover 264 with an adhesive. If this configuration is used, die-cut elastomeric thermal interface pads can be used between the plates 272 and the module's lower bi-metallic buss bars 309 to ensure effective thermal transfer and electrical isolation.

In some applications requiring less stringent demand on the cells, air can be used instead of liquid. The heat sink 314 can be nested within the overall length of the module for compactness of the package. In alternative embodiments, the heat sink 314 can be replaced with a dedicated air heat exchanger. Using an efficient liquid cooling system within the battery module, environmental exposure of the battery cells and their terminals is mitigated. Within a module, power terminals of the battery cells can be environmentally sealed according to the IP67 standard, protecting the terminals at voltage from corrosion.

FIG. 5A illustrates a version of the buss bars 308, 309 in FIG. 3A. A feature accomplished by an exemplary embodiment of the invention is the ability to effectively laser weld terminals of the battery cells to the buss bars by applying the laser in a direction towards a peripheral outer surface of the terminals so as to avoid unnecessary contact with elements surrounding the terminals. Such contact could otherwise occur is the laser is directed more towards an axial direction of the cells, i.e., downward toward the terminals. As shown in FIG. 5a, buss bars 628 are disposed over terminals 632 of the battery cells 310 and have contours that correspond to the terminals 632. The contours may comprise triangular or partial diamond shape protrusions 636, for example, with first and second sides 640, 644 that extend along peripheries of the terminals 632. This arrangement permits an effective welding operation because the terminals 632 are oriented to correspond with the buss bars' 628 shape. The weld creates an electrical connection between the terminal 632 and buss bars 628.

Accordingly, a weld is easily applied and has structural integrity due to an increased weld length. Other suitable shapes may also be used for the protrusions 636 that provide an adequate electrical connection to the terminals 632, while allowing a laser weld to be efficiently applied from a side of the cell casing 312, instead of directing the laser along an axial direction of the battery cells 310, which could cause damage to components of the battery module. The group of battery cells 310 may comprise at least a first and second row, and the terminals 632 have a circumferential shape with a plurality of corners. In an exemplary embodiment, one of the corners of the terminals 632 in the first row points away from the second row, and one of the corners of the terminals 632 in the second row points away from the first row.

During assembly, a weld 648 is applied in a direction along the first and second sides 640, 644 of the protrusions 636. The shape of the buss bars 628 provides coverage of multiple rows of battery cells 310, while reducing the amount maternal needed for each buss bar. With additional reference to FIG. 5b, vents 652 may be placed in the cells 310 for releasing gas if the battery were to overheat. It may be desirable to locate the vents below the buss bars 628. Vents 652 are for releasing gas and may be used at one or both ends of the battery cell 310. The vents 652 emit hot expelled gas, for example, if the cell 310 overheats. By forcing the terminals 632 to have a particular alignment with respect to the protrusions 636, the vents can be positioned rotationally in a proper position under the buss bars 628 by aligning a marker, for example, on the cells 310 with respect to the protrusions 636. Similar to previous embodiments, the buss bars 628 at the opposite ends may each have an extended tab 656 that is bent along a side of the cell case 312. A hole 660 can be placed in the extension tab 656 for making an electrical connection with other battery modules.

Figure 5B:
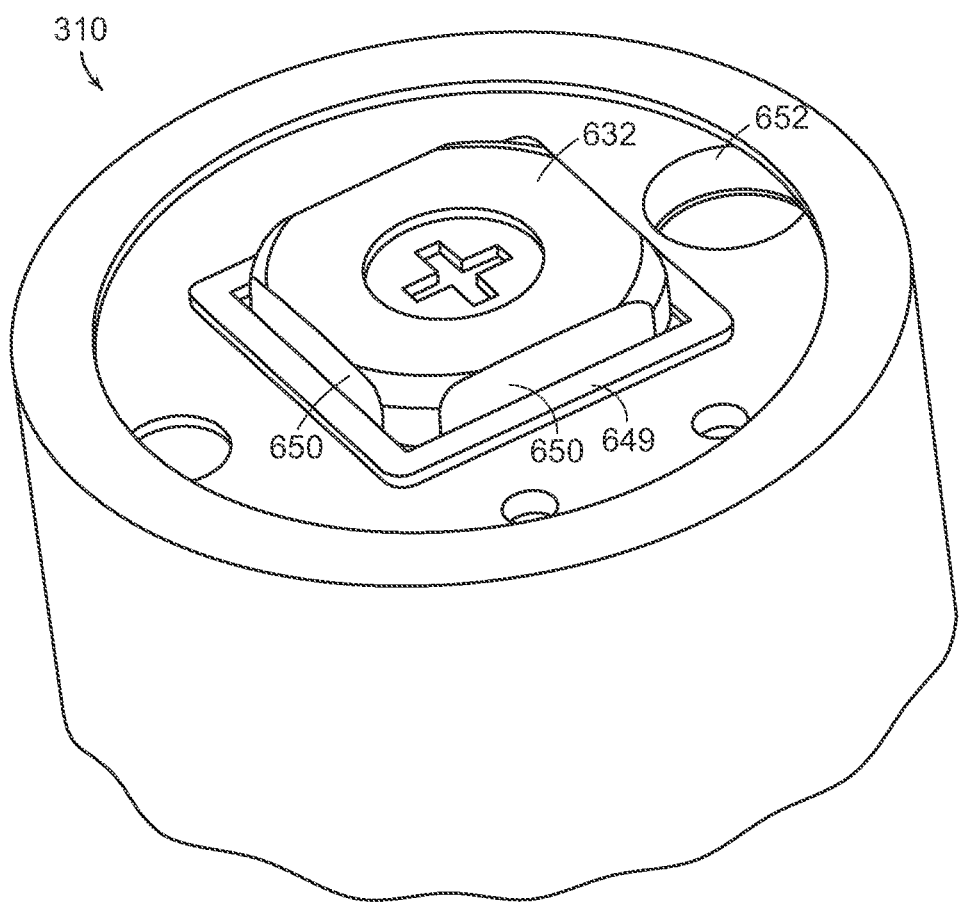
FIG. 5B is a perspective view of a portion of a cell terminal from FIG. 5a, according to one or more embodiments of the invention.

As shown in FIG. 5B, terminal seals 649 are provided around a circumference of the terminals 632. It is important that the terminal seals 649 are not damaged when the buss bars 628 are coupled, e.g., welded, to the terminals 632. In accordance with an aspect of the invention, the buss bars 628 are configured to be laser welded to the terminals 632 while reducing the chance of damage to the terminal seals 649. This is done in part by disposing the outer circumferential faces 650 of the terminal so they are accessible by a welding laser that is directed toward the circumferential faces 650. For example, a laser beam may be directed in a direction perpendicular or substantially perpendicular to the axial direction of the cells 310.

Figure 5C:
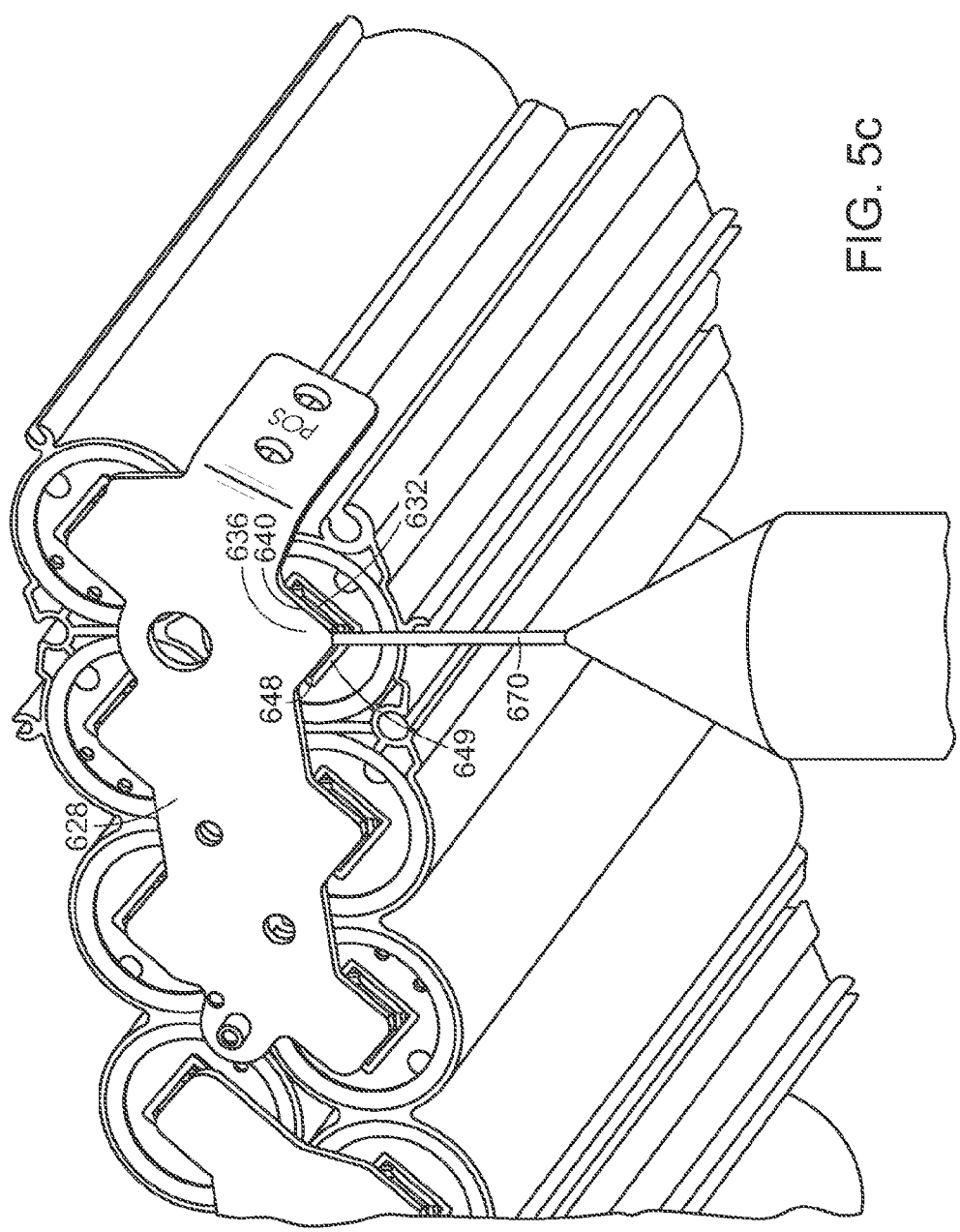
FIGS. 5C and 5D are perspective views showing a weld being applied to a terminal area of a cell, according to one or more embodiments of the invention.
Figure 5D:
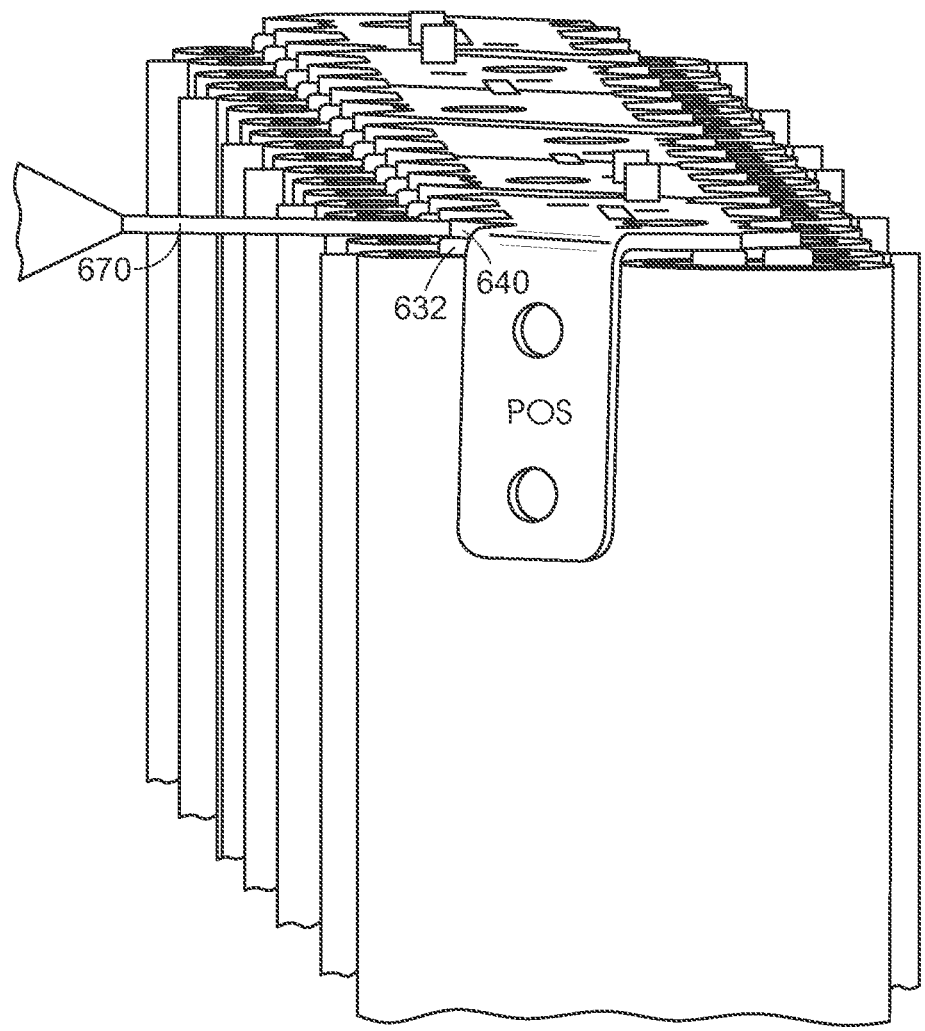

FIGS. 5C and 5D illustrate a weld being applied to a terminal area of a cell in a manner that is substantially perpendicular to a longitudinal direction of the cells 310. In accordance with an exemplary aspect of the invention, a laser beam 670 effectively impinges on the area of contact between the protrusions 636 of the buss bars 628 and the terminals 632 because of the buss bar design and provides an effective weld, while reducing or preventing damage to the terminal seals 649 that could otherwise be damaged when a laser weld is applied in an axial direction of the cells 310. The laser beam 670 will move along the protrusions 636 and terminals 632 in a direction of the first and second sides 640, 644 of the protrusions 636.

Figure 6:
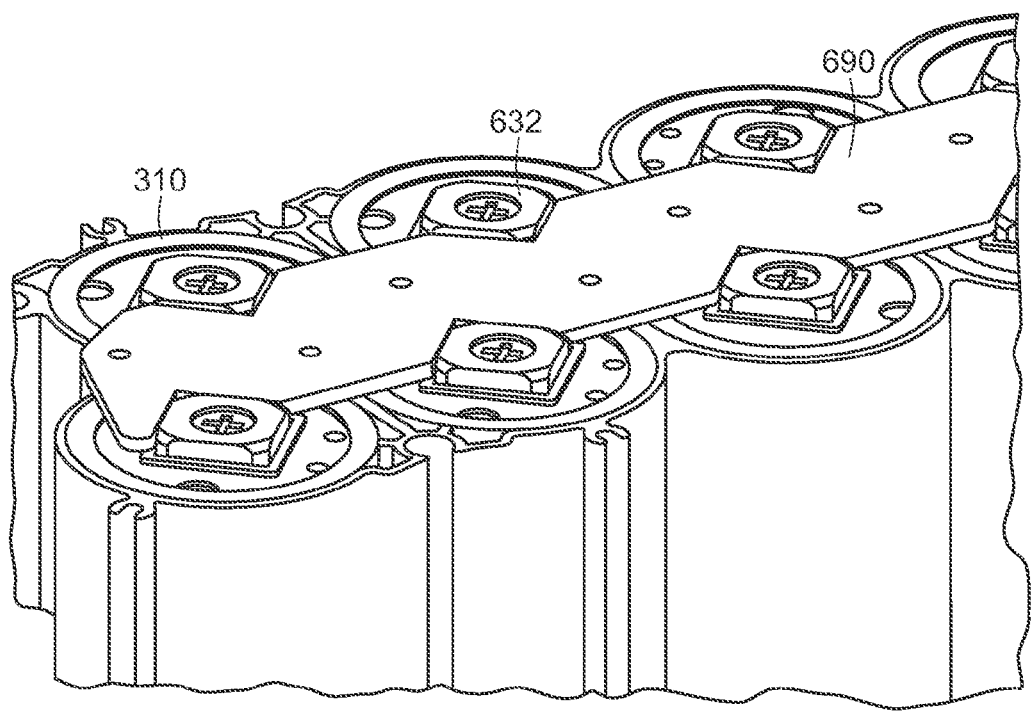
FIG. 6 is a perspective view of a battery module according to one or more embodiments of the invention.

FIGS. 6 and 7 illustrate an array of cells 310 that are clocked or rotationally positioned to a predetermined angle by using a positioning bar 690. The positioning bar 690 may be used to assist in rotationally positioning the cells 310 in a manner that ensures that the cell vents 652, shown in FIG. 5b, are disposed beneath the buss bars 628. Regardless of how the cells 310 are positioned, it is desirable, in some embodiments, to locate the vents 652 beneath the buss bars 628 to help prevent hot gas from reaching the cover of the battery module, which could otherwise cause damage.

Figure 8:
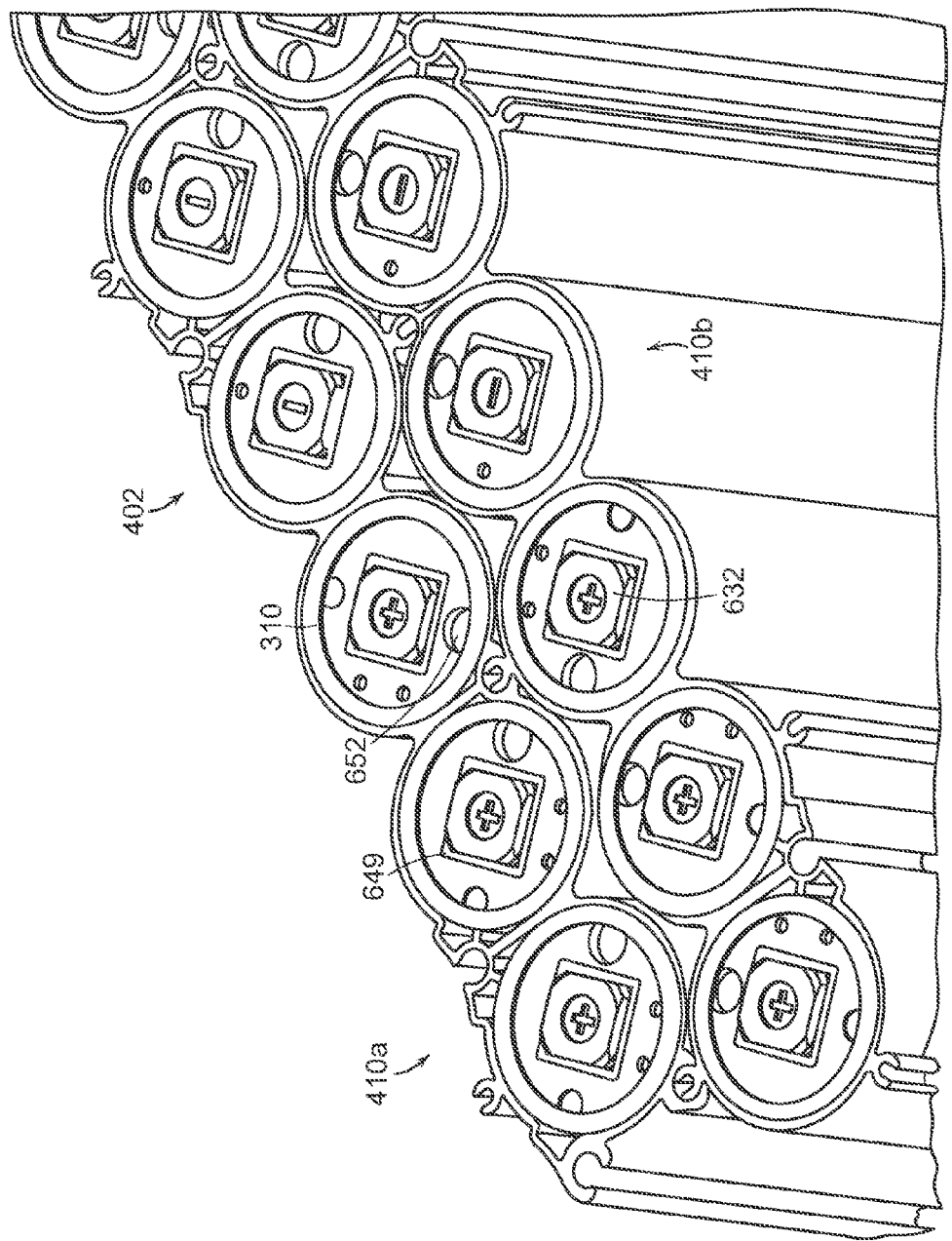
FIG. 8 is a perspective view of a battery module according to one or more embodiments of the invention.
Figure 9:
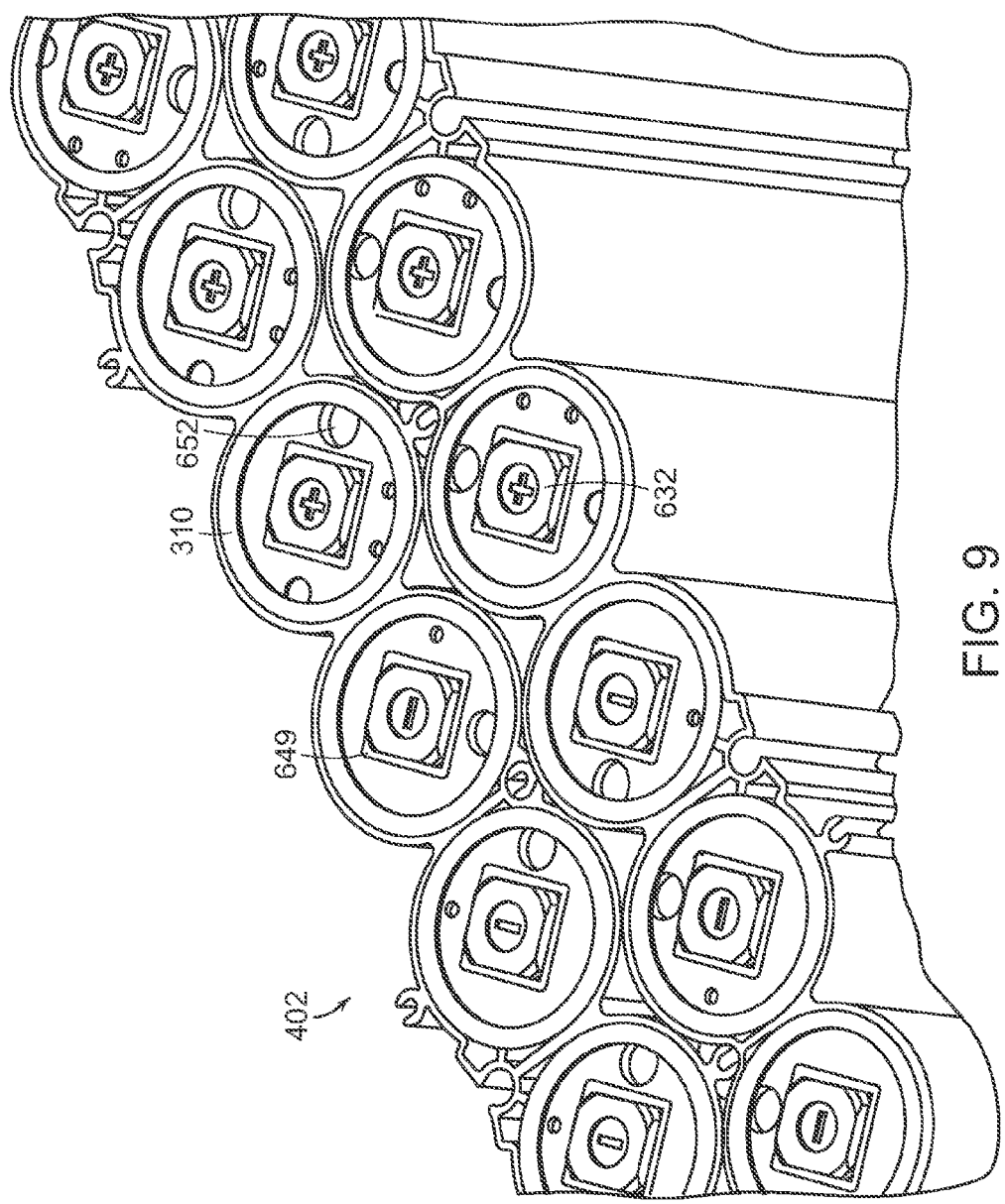
FIG. 9 is a perspective view of a battery module according to one or more embodiments of the invention.

The battery cells 310 do not need to have the same orientation when placed inside the cell case 312. FIG. 8 is a perspective view of a battery module 402, wherein some of the cells in the module are disposed in a direction opposite to the other cells in the module. For example, the cells 410a at the left hand side of the module 402 can have their positive power terminals facing upward, while the cells 410b at the right hand side of the module 402 can have their positive power terminals facing downward. FIG. 9 illustrates a corresponding bottom portion of the battery module 402. Thus, a battery module may be provided that includes battery cells disposed in an alternating manner. For example, certain cells may have their negative power terminals facing upward, while other cells have their negative power terminals facing downward. A buss bar, such as those described herein, can therefore connect the positive power terminals of cells with the negative power terminals of cells. Hence, while certain cell groups are connected in parallel, cell groups can also be connected in series.

Figure 10B:
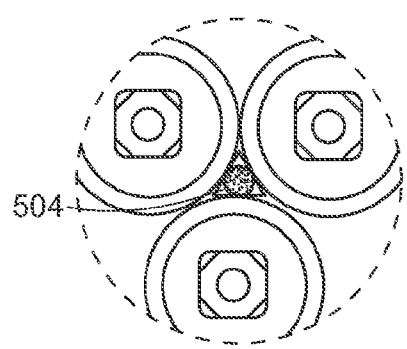
Figure 10A:
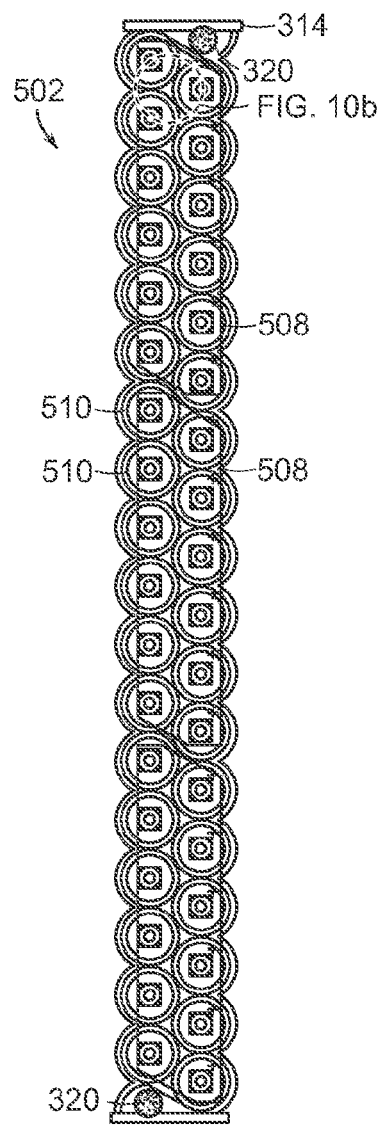
FIG. 10A is a bottom view of a battery module according to one or more embodiments of the invention.

FIG. 10a is a bottom view of a battery module 502 according to one or more embodiments of the invention, the module 502 having two rows of battery cells 510 and a series of buss bars 508. As shown, a buss bar 508 can have a width that covers both rows of battery cells 510. A heat sink 314 with cooling liquid inlets/outlets 320 is also shown.

FIG. 10b is an enlarged view of a portion of FIG. 10a. As illustrated, enclosed within the three adjacent battery cells there is a space 504. According to an exemplary embodiment, a cooling channel in communication with a cooling device or fluid can be disposed within space 504. The cooling channel can be used for reducing the temperature of the cells.

Figure 11:
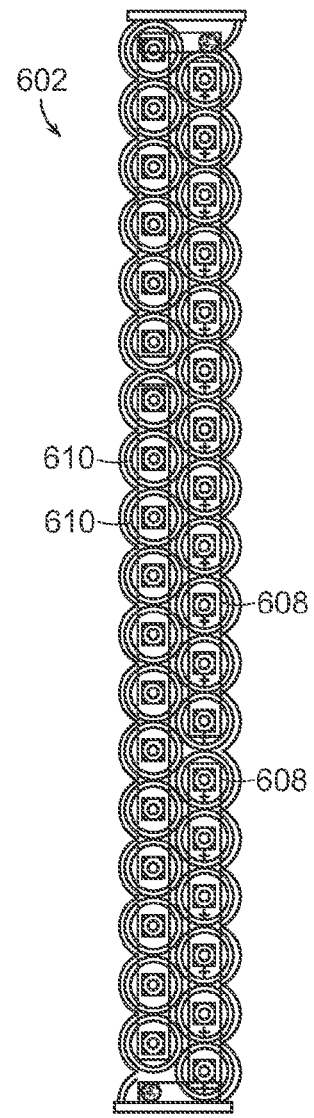
FIG. 11 is a top view of a battery module according to one or more embodiments of the invention.

FIG. 11 is a top view of a battery module 602 according to one or more embodiments of the invention. The module 602 has two rows of battery cells 610 and a series of buss bars 608. Buss bars 608 each have a width that covers battery cells in a single row.

Figure 12:
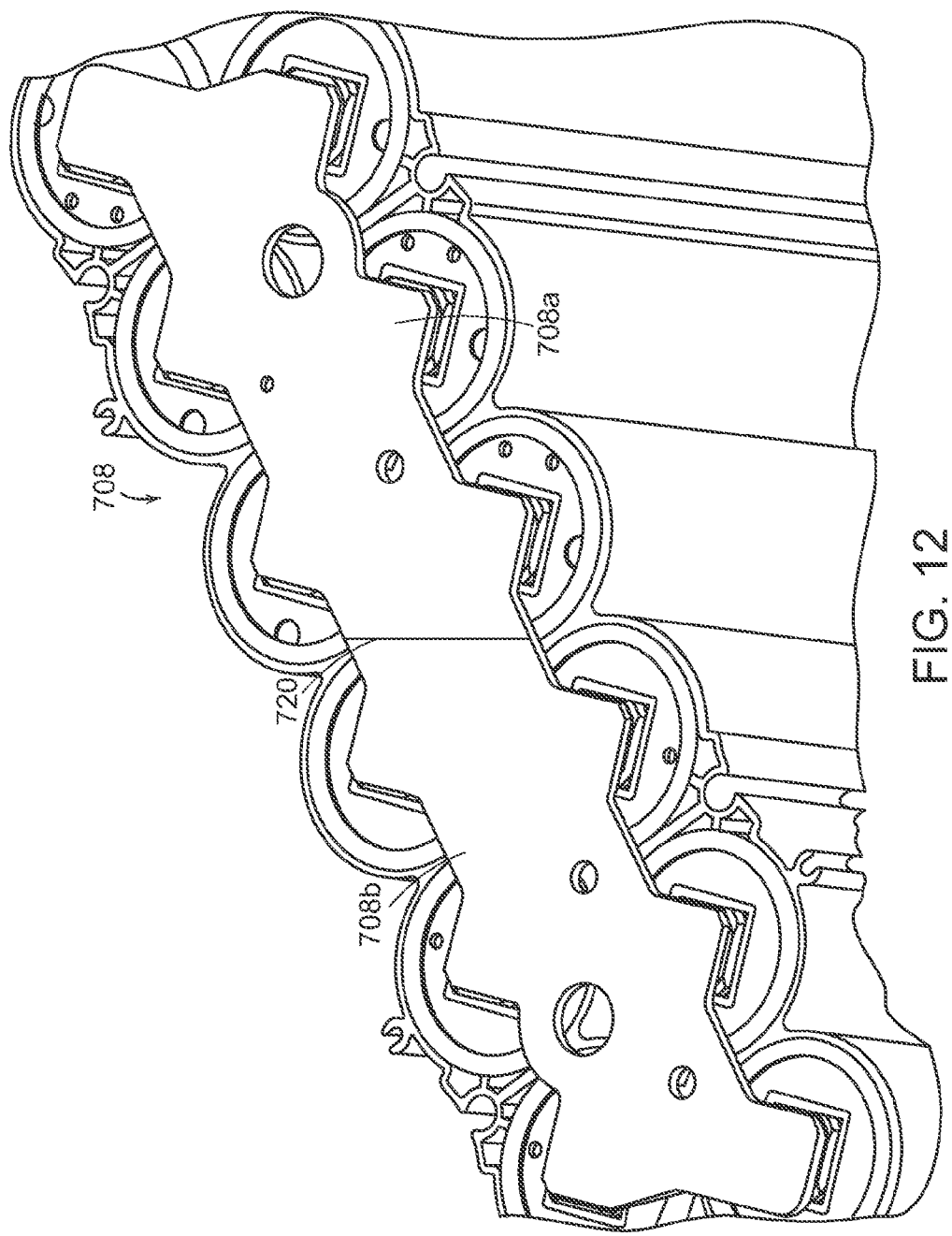
FIG. 12 is a perspective view of a battery module according to one or more embodiments of the invention.

In some embodiments, a battery module can have buss bars with portions made from different materials. For example, as shown in FIGS. 12 and 13a, buss bars 708, 712 can have first portions 708a, 712a that are made from aluminum, and second portions 708b, 712b that are made from copper. If the positive terminals of the cells 710a are made from aluminum, these terminals can be appropriately welded with the aluminum portion 712a to form an electrical connection. Similarly, if the negative terminals of the cells 710b are made from copper or nickel coated steel, these negative terminals can be easily welded with copper portion 712b to form an electrical connection. Therefore, a bi-metallic buss bar can facilitate the connection of the buss bar with power terminals made from two different metals. The bi-metallic buss bar may be formed with a friction weld 720 to couple the different pieces of material.

Figure 13B:
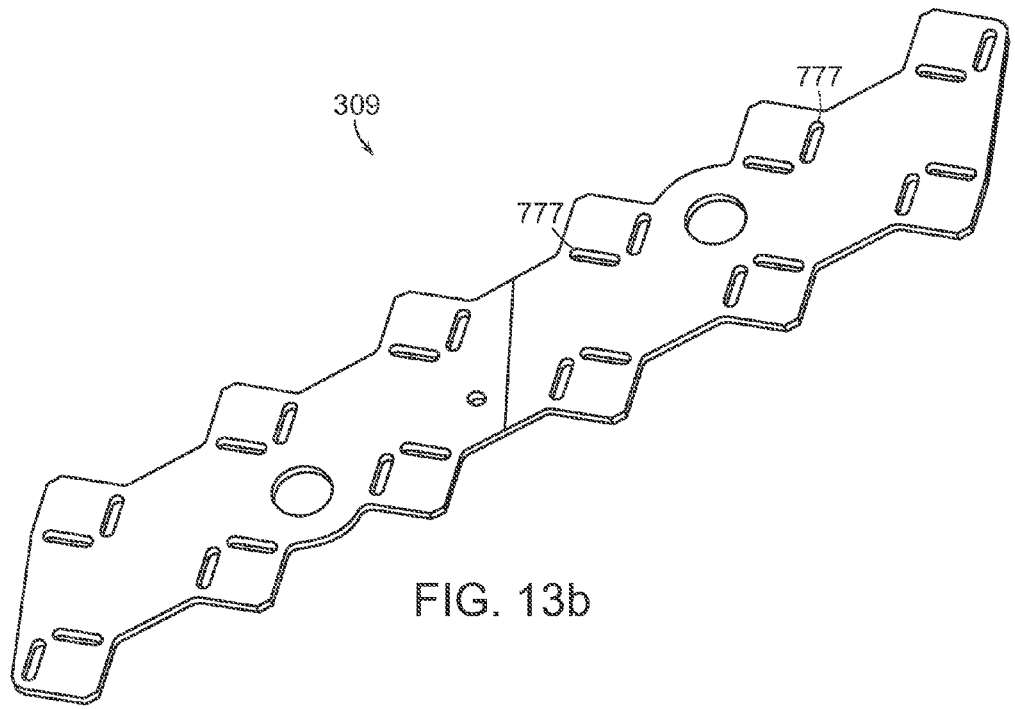
FIGS. 13B and 13C are perspective views of buss bars according to one or more embodiments of the invention.
Figure 13C:
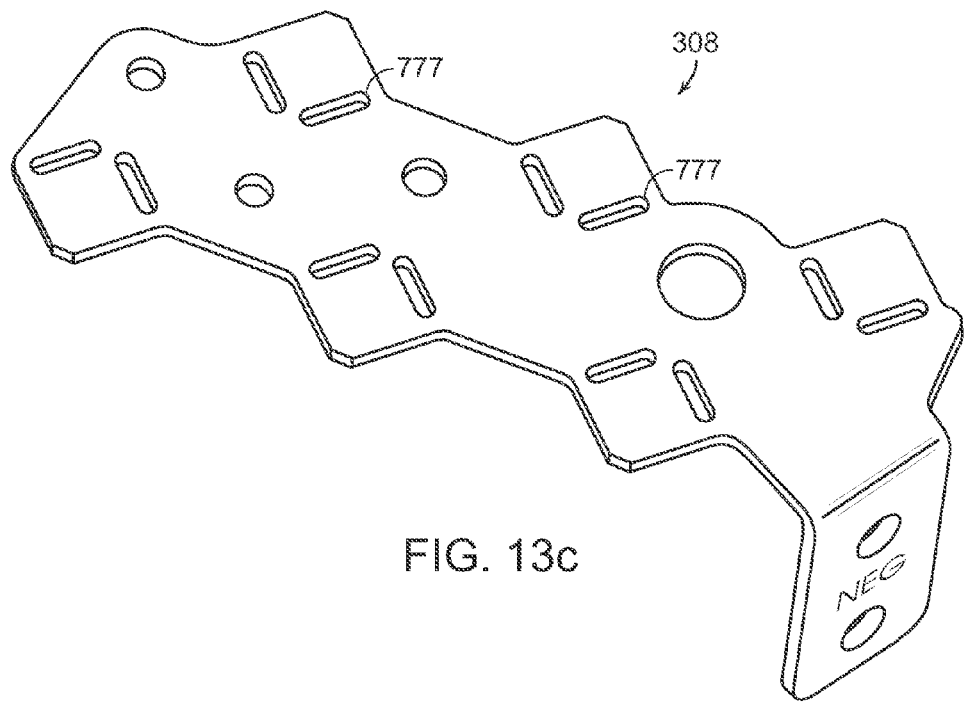

As shown in FIGS. 13b and 13c, the upper buss bars 308 and lower buss bars 309 may have a fuse integrated directly into them. Each of the upper buss bars 308 and low buss bars 309 may have this configuration. This fuse is an array of precision punched holes and/or slots 777 to form a zipper fuse. Incorporating the fuse in the buss bar is a robust, compact, and cost effective approach to enhance the module's safety capability. For the potential worst-case failure mode during a severe vehicle crash, the fuse mechanically disconnects and electrically isolates a cell with an electrical overload from the buss bar. Experimentation and analysis reveals the zipper fuse's optimal geometry so that it will actuate within a specified time period that prevents a cascading failure mode with the adjacent cells or potentially all of the cells in a module.

Figure 14A:
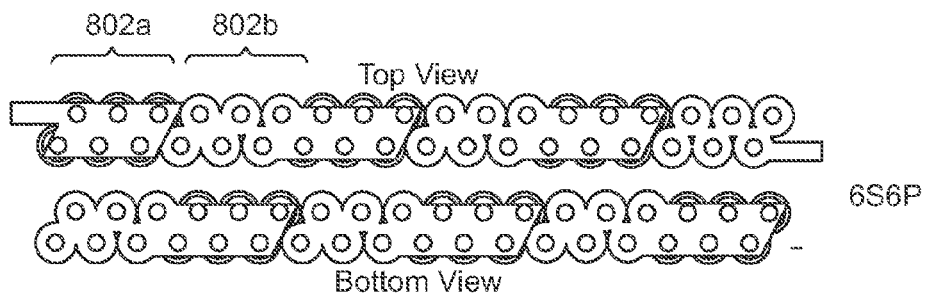
FIG. 14A is a top view and a bottom view of a battery module having cell and buss bar configurations according to an exemplary embodiment.
Figure 14B:
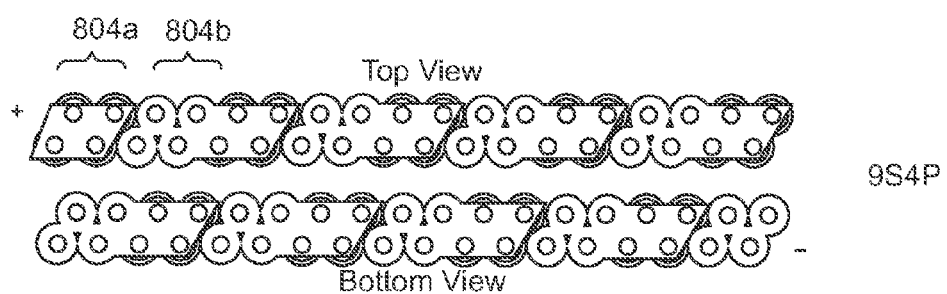
FIG. 14B is a top view and a bottom view of a battery module having cell and buss bar configurations according to an exemplary embodiment.
Figure 14C:
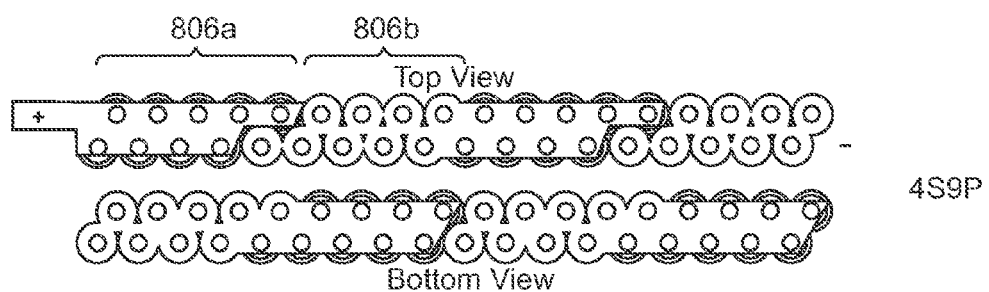
FIG. 14C is a top view and a bottom view of a battery module having cell and buss bar configurations according to an exemplary embodiment.

By using different configurations of the battery cells and the buss bars, a battery module having a fixed total energy can provide different output voltages. FIGS. 14A, 14B, and 14C illustrate examples of this concept. FIGS. 14A, 14B, and 14C each include a top view and a bottom view of a battery module having 36 battery cells, therefore, the total energy of the three battery modules in FIGS. 14A, 14B, and 14C is constant. In FIG. 14A, the 36 cells are grouped into 6 groups of cells (e.g., groups 802a, 802b), wherein the cells in each group are connected in parallel, and the 6 groups are connected in series. Therefore, the voltage provided by the battery module illustrated in FIG. 14A is 6 times the voltage of the individual battery cells. This configuration is referred to as the 6S6P configuration and is facilitated by the unique disposition of the buss bars.

In FIG. 14B, the 36 cells are grouped into 9 groups of 4 cells (e.g., groups 804a, 804b), wherein the cells in each group are connected in parallel, and the 9 groups are connected in series. Therefore, the voltage provided by the battery module illustrated in FIG. 14B is 9 times the voltage of the individual battery cells. This configuration is referred to as the 9S4P configuration. In FIG. 14C, the 36 cells are grouped into 4 groups of 9 cells (e.g., groups 806a, 806b), wherein the cells in each group are connected in parallel, and the 4 groups are connected in series. Therefore, the voltage provided by the battery module illustrated in FIG. 8C is 4 times the voltage of the individual battery cells. This configuration is referred to as the 4S9P configuration. It is noted that the cells connected in parallel are not limited to an even number of cells, nor is there a particular limitation on the number of rows.

Hence, by changing the orientation of the cells and the buss bars, a battery module according to various embodiments can be flexibly configured to provide different output voltages. The performance of the 3 different configurations described in connection with FIGS. 14A, 14B, and 14C above using 36 A123 32157 HD battery cells is described in Table I below.

TABLE I

| | Description | | |
|---|---|---|---|
| Configuration | 28 Volts @ 1 kWh 9S4P - 32157 HD | 18 Volts at 1 kWh 6S6P - 32157 HD | 12 Volts at 1 kWh 4S9P - 32157 HD |
| Capacity (Amp-Hr) | 9.5 | 9.5 | 9.5 |
| Energy (W-Hr) | 34.2 | 34.2 | 34.2 |
| 10s Max Discharge (A){8C-rate} | 304 | 456 | 684 |
| Cont. Discharge (A) {2.5C-rate} | 95 | 143 | 214 |
| Total cells | 36 | 36 | 36 |
| Vmax | 32.4 | 21.6 | 14.4 |
| Vnom | 28.8 | 19.2 | 12.8 |
| Vmin | 22.5 | 15.0 | 10.0 |
| Module Capacity (A-Hr) | 38.0 | 57.0 | 85.5 |
| Module Energy - BOL (W-Hr) | 1094.4 | 1094.4 | 1094.4 |
| Module Energy - EOL (W-Hr) | 875.5 | 875.5 | 875.5 |
| 36 Cells Weight (kg) | 10.08 | 10.08 | 10.08 |
| Module Weight (kg) (est) | 11.86 | 11.86 | 11.86 |

Figure 15A:
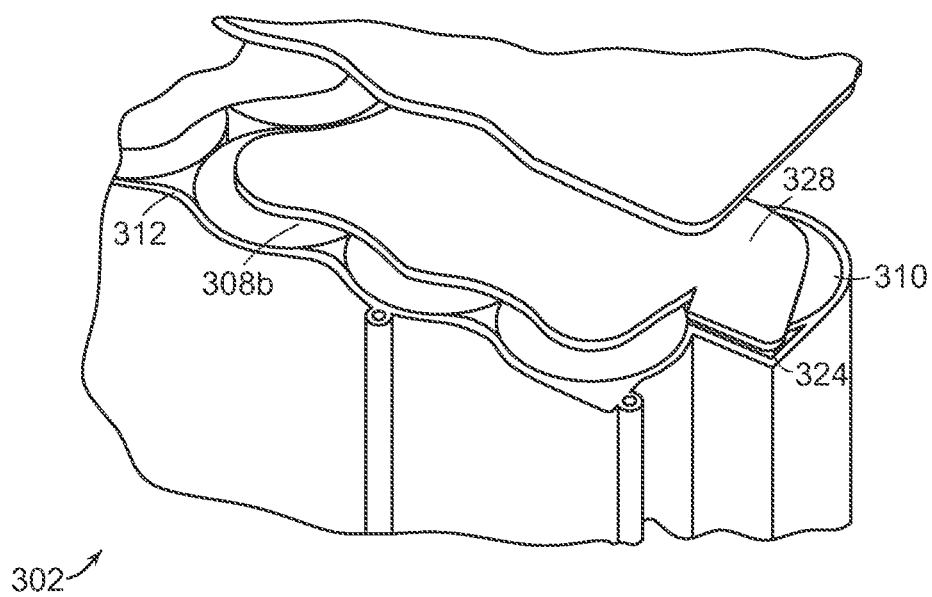
FIG. 15A is a perspective view showing a corner of a battery module according to one or more embodiments of the invention.
Figure 15B:
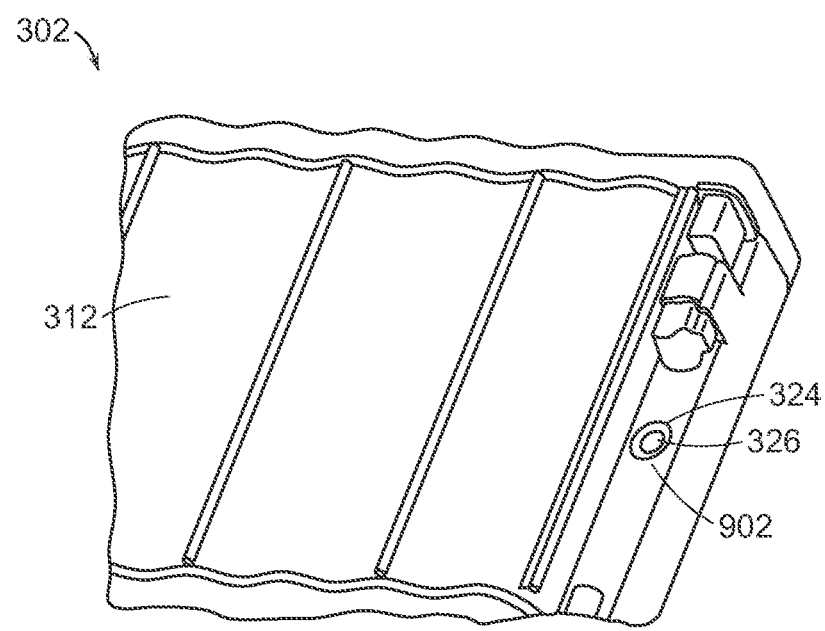
FIG. 15B is a perspective view showing a side of a battery module according to one or more embodiments of the invention.

As described in connection with FIG. 3A, for example, in some embodiments, a battery module 302 can use buss bars that have an extension tab 324. FIG. 15A is a perspective view showing the upper right corner of an exemplary battery module 302. Module 302 has a buss bar 308b on the top of the battery cells 310. The buss bar 308b has an extension tab 324 that has been bent downwards from the face 328 of the buss bar, such that the extension tab is inserted into a confined opening of the cell case 312 so that only the proximal end of the tab 324 is visible in FIG. 15A. FIG. 15B is a perspective view of the battery module 302. In FIG. 15B, there is an opening 902 on the cell case 302, making a portion of the distal end of the extended tab 324 visible. The distal end of the extended tab 324 has a hole or opening 326, which allows a bolt (not shown) to be inserted through the extended tab 324 and to make an electrical connection with the tab 324. The bolt may mate with a nut fixed to the case 312. By providing the extended tab 324 in the case 312, it is held in place rotationally, such that forces applied to the extended tab 324 during torquing of the bolt are absorbed by the case 312 and not exerted on other portions of the module 302, so as to reduce incidental stress applied to such other portions. When multiple modules are grouped and aligned together to form a battery, a bolt can pass through an extended tab in the extrusion of one module and make an electrical connection with extended tabs of other modules without exerting mechanical torques on power terminals. Another advantage of using the extended tabs for making electrical connections is that the battery cover can be sealed around the perimeter of the module cover, thus avoiding complex seal configurations at the cover.

Figure 16A:
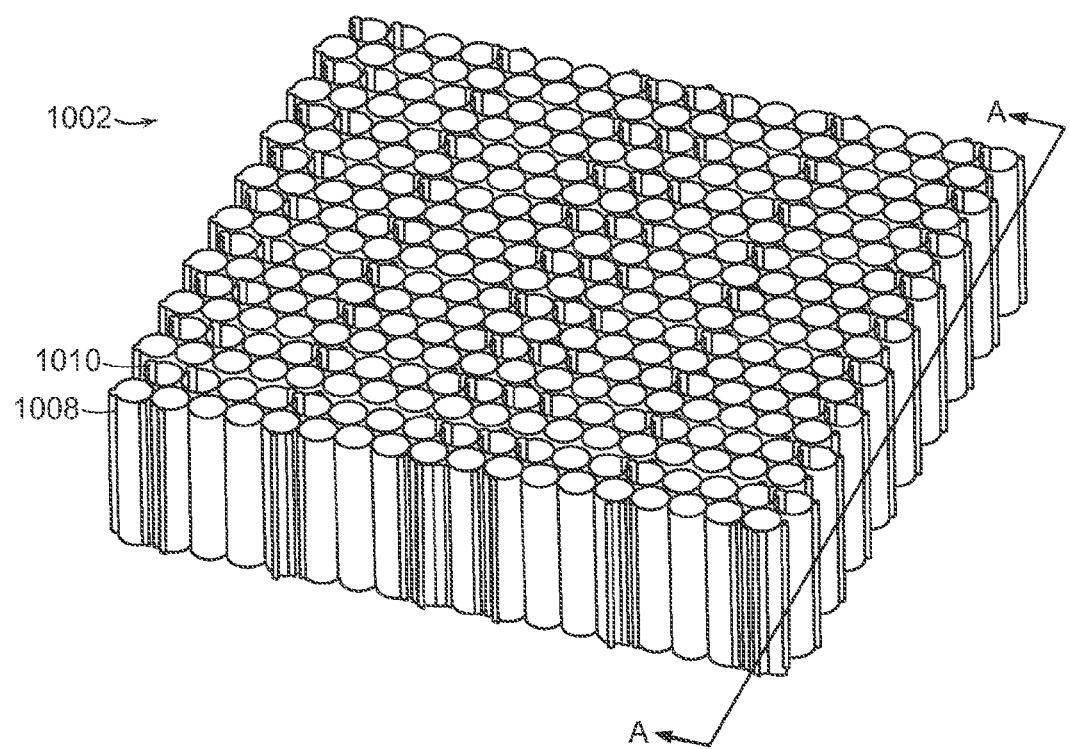
FIG. 16A is a perspective view showing cell casings of multiple battery modules joined together.

FIG. 16A is a perspective view showing multiple battery modules 1002 joined together. In this exemplary embodiment, each battery module may include one of more rows of battery cells depending on the desired configuration. In some embodiments, battery modules can be joined by using interlocking tabs on the cell cases in the modules. It will be appreciated that different numbers of modules may be used depending on design objectives.

Figure 16B:
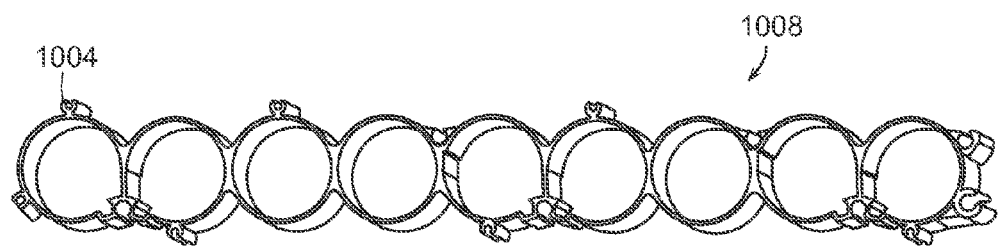
FIG. 16B is a sectional view illustrating a portion of a cell casing taken along the lines A-A of FIG. 16A, according to one or more embodiments of the invention.
Figure 16C:
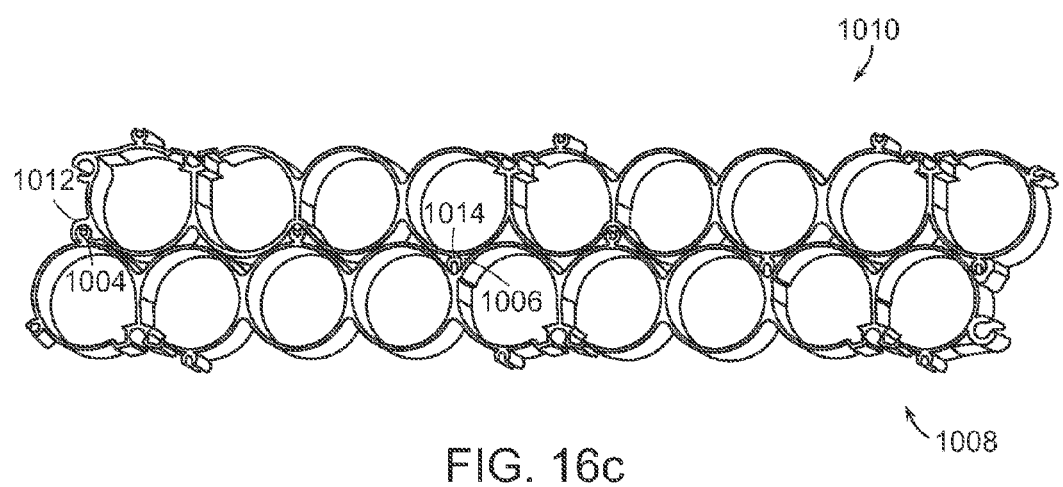
FIG. 16C is a sectional view illustrating portions of cell casings taken along the lines A-A of FIG. 16A, according to one or more embodiments of the invention.
Figure 16D:
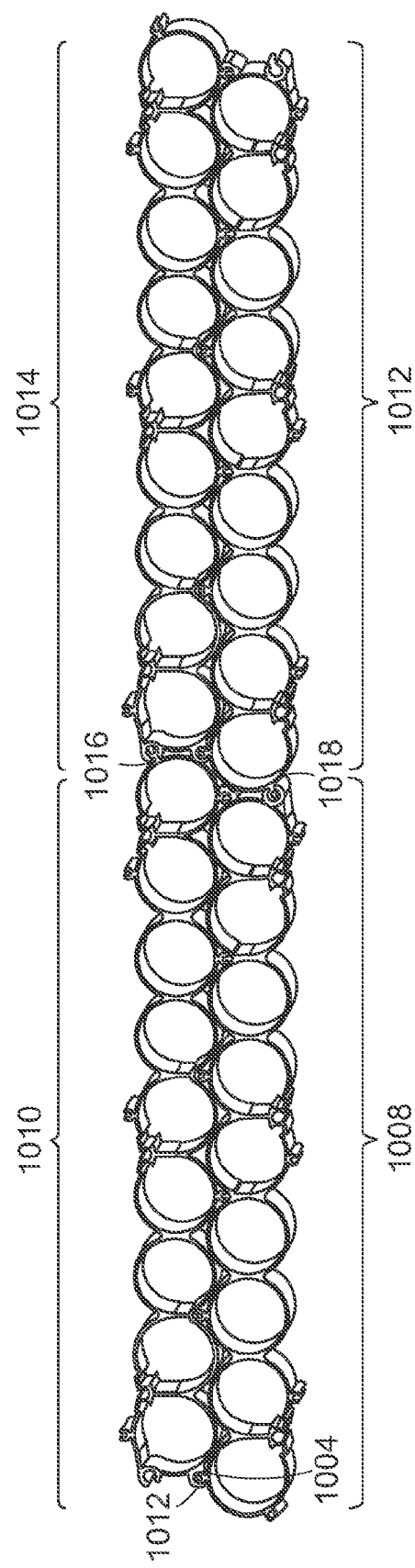
FIG. 16D is a sectional view illustrating portions of cell casings taken along the lines A-A of FIG. 16A, according to one or more embodiments of the invention.

FIG. 16B is a sectional view of a portion of a battery module taken along the lines A-A of FIG. 10a. FIG. 16C is a sectional view of the battery module 1008 coupled to an adjacent module 1010 taken along the lines A-A of FIG. 16A. As shown, the module 1008 has a tab 1004 extending from the cell case that can be interlocked with a slot 1012 in the cell case of the module 1010. Similarly, the module 1008 has a slot 1006 that can be locked with a tab 1014 of the cell case of the module 1010. FIG. 16D is a sectional view taken along the lines A-A of FIG. 16a showing the two battery modules 1008 and 1010 joined together using the interlocking mechanisms. The battery modules 1008 and 1010 are coupled to adjacent modules 1012 and 1014 using slots and tabs at distal ends 1016 and 1018 of the modules 1008, 1010, 1012 and 1014.

Figure 17:
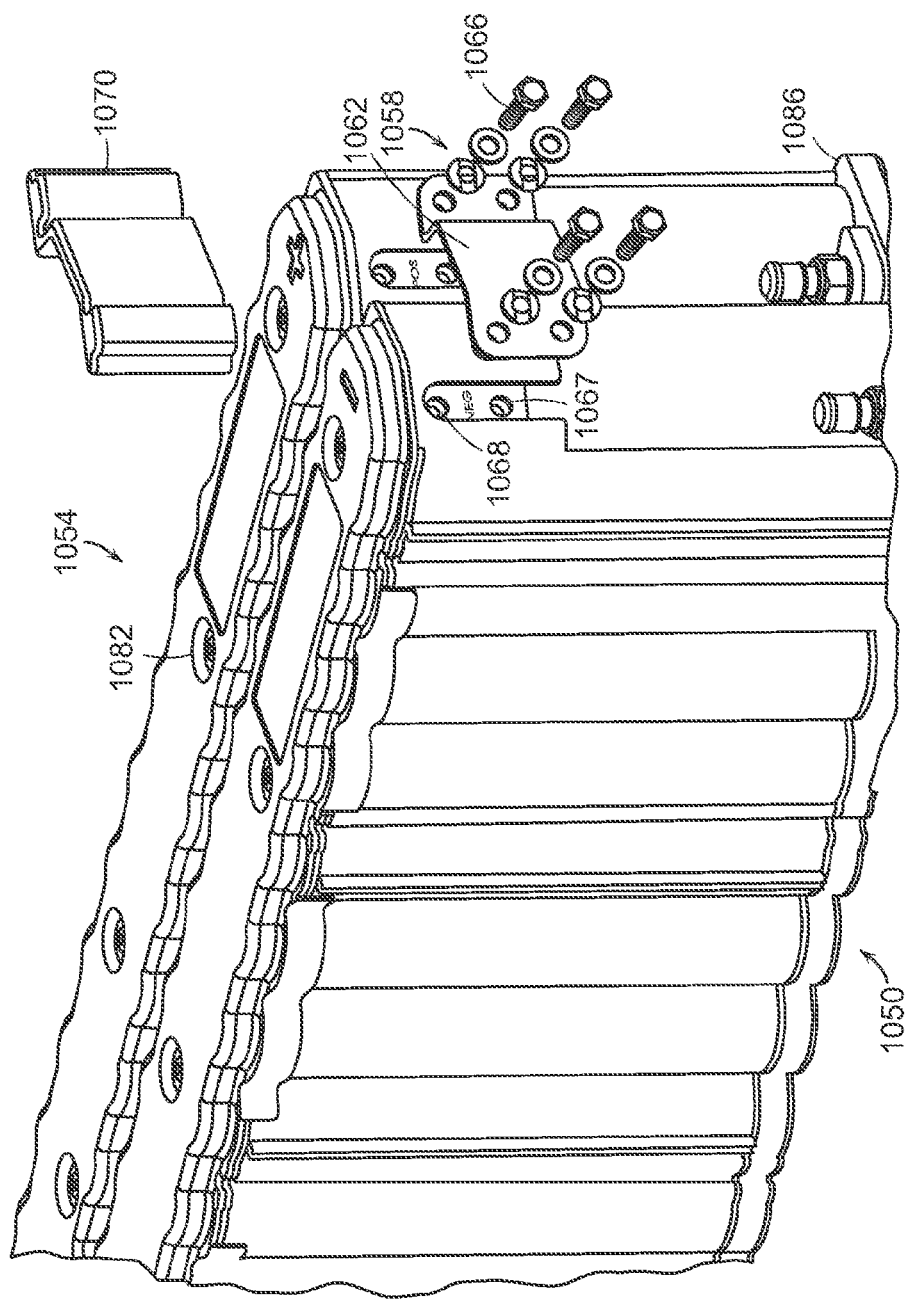
FIG. 17 is a perspective view of multiple modules coupled to each other according to one or more embodiments of the invention.
Figure 18:
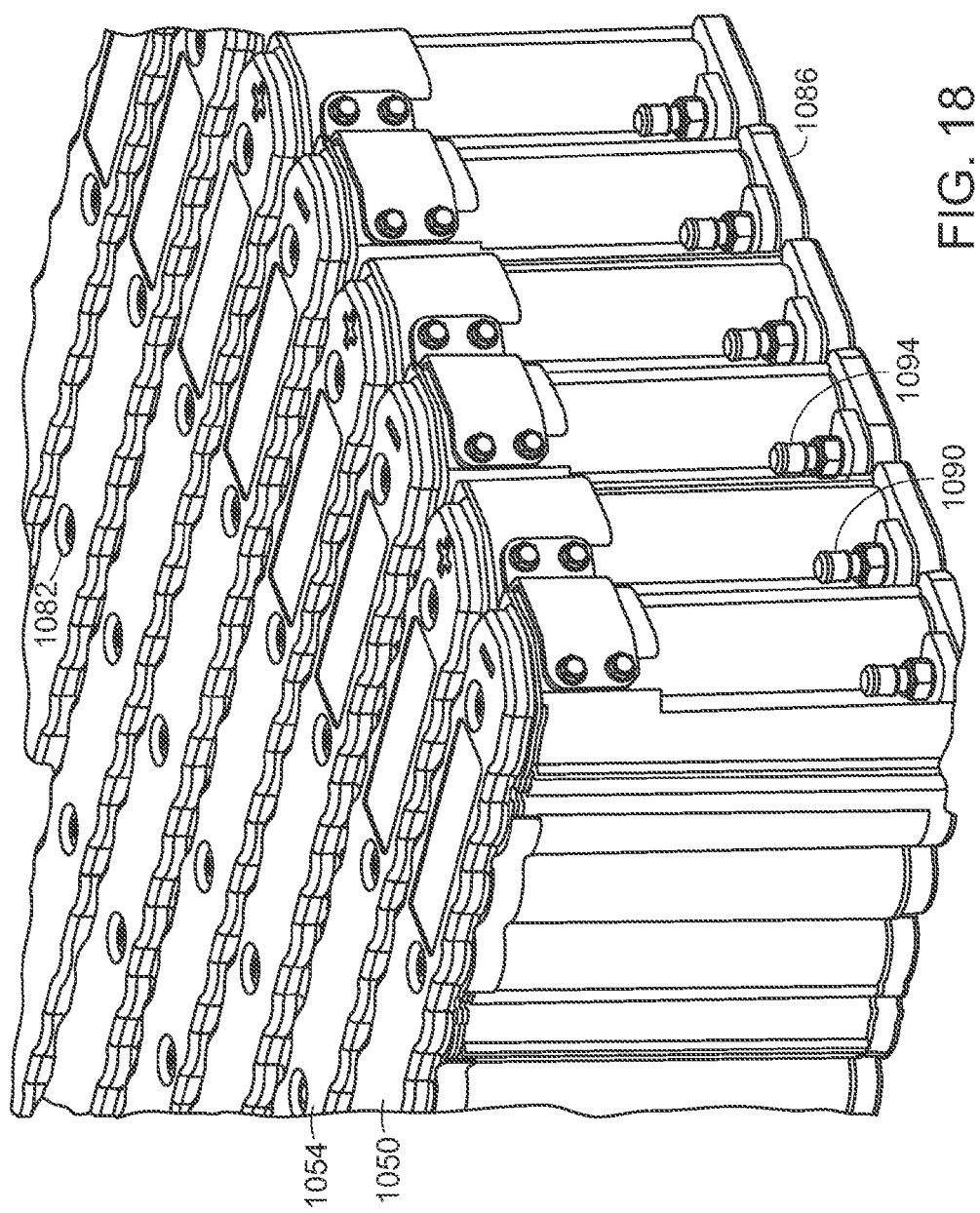
FIG. 18 is a perspective view of multiple modules coupled to each other according to one or more embodiments of the invention.

FIGS. 17 and 18 illustrate a plurality of assembled cell modules 1050, 1054, etc. in a coupled relationship. The cell modules 1050, 1054 are electrically coupled by a connecting fixture 1058. In the embodiment of FIG. 17, the cell modules 1050, 1054 are connected in series such that the negative end of the cell module 1050 is connected to the positive end of the cell module 1054. A positive terminal of one module can be electrically connected with a positive terminal of another module (and the negative with the negative) so that the two modules are connected in parallel. Alternatively, a positive terminal of one module can be electrically connected with a negative terminal of another module so that the two modules are connected in series. The ability to nest the modules provides an effective and efficient way to make a multi-module configuration.

Figure 19:
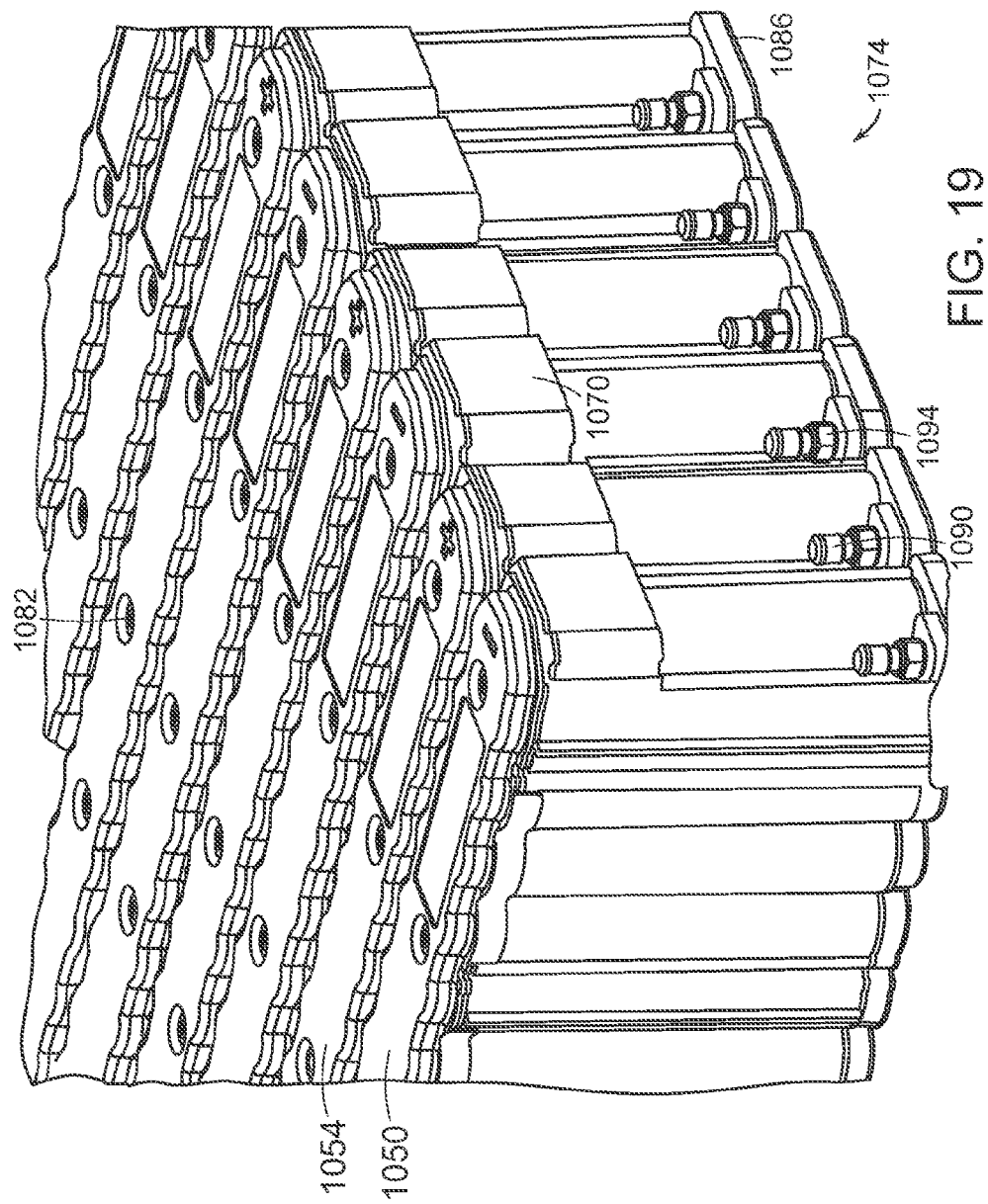
FIG. 19 is a perspective view of multiple modules coupled to each other according to one or more embodiments of the invention.
Figure 20:
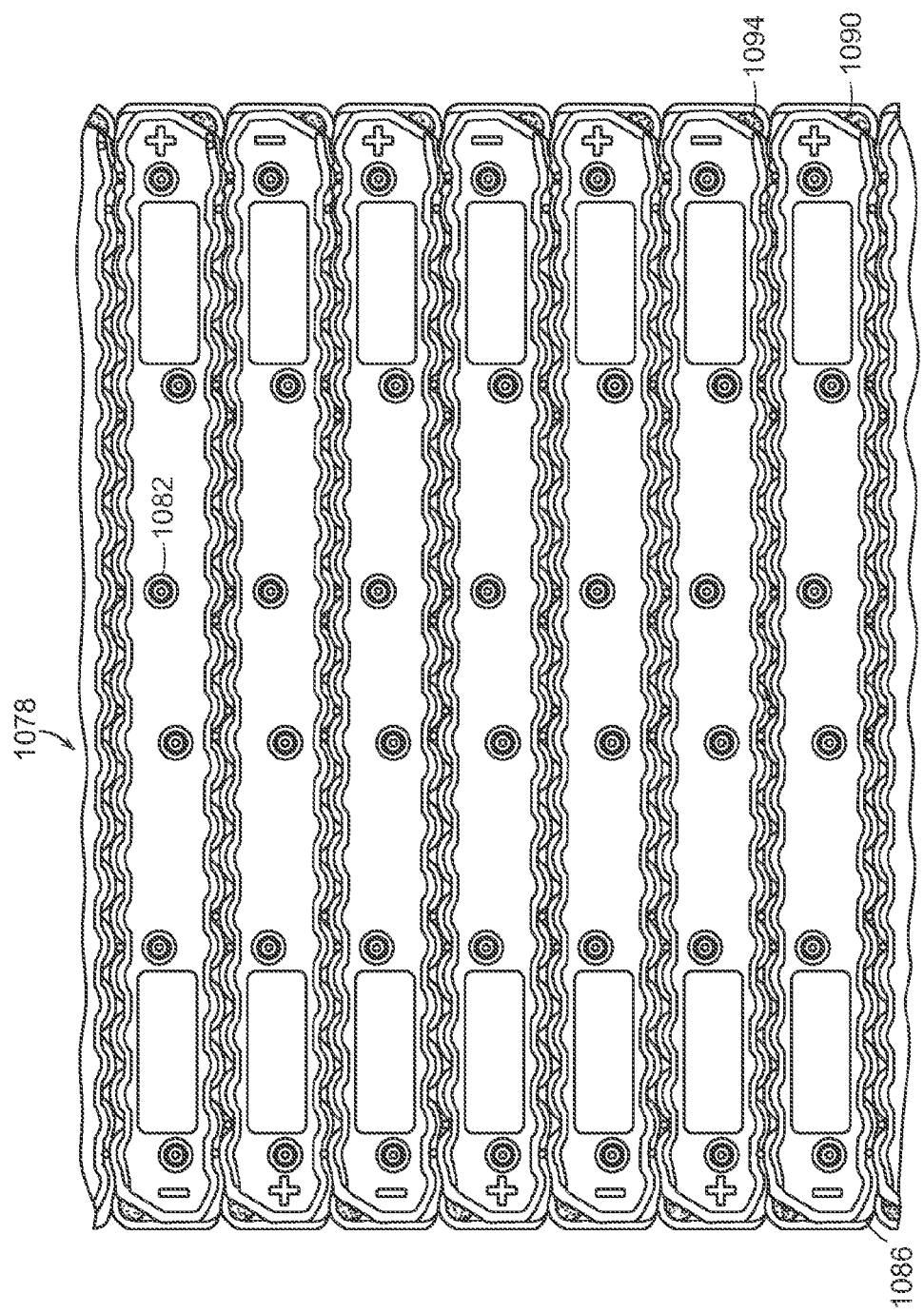
FIG. 20 is a top view illustrating multiple modules coupled to each other according to one or more embodiments of the invention.

The connecting fixtures 1058 may comprise a conductive plate 1062 or other suitable connector that makes an electrical connection between the cell modules. The exemplary embodiment of FIG. 17 illustrates the connecting fixture 1058 as utilizing fastening bolts 1066 that mate with holes 1067 and 1068 in the underlying buss bars. It will be appreciated that the connecting fixture 1058 is not limited to this design, and may take the form of other configurations that would provide a suitable electrical connection. An insulating cover 1070, such as a plastic cover, may be disposed over the connecting fixture 1058 to electrically isolate and protect the electrical connection between adjacent cell modules. FIG. 19 illustrates an array of coupled cell modules 1074 with the covers installed 1070. FIG. 20 is a top view of multiple cell modules 1078 coupled together using the aforementioned tab and slot coupling configuration. Top portions of tie bolts 1082 are visible in FIGS. 17-20, as well as base portions 1086 of the cell modules and coolant fluid inputs and outputs 1090, 1094.

As mentioned above, in some exemplary embodiments, a bi-metallic buss bar can preferably, but not necessarily, be used to make electrical connections with power terminals of both polarity. A bi-metallic buss bar can be produced, for example, by identifying an intermediate material that can be welded with both metals. As an example, silver may be used as an intermediate material for an aluminum and copper bi-metallic buss bar. Another way to make a bi-metallic buss bar is by cladding to bond together the dissimilar metals, for example by extruding two metals through a die, or pressing sheets of the materials together under high pressure. Yet another exemplary approach is to use friction welding techniques, as will be appreciated by one skilled in the art.

Figure 21:
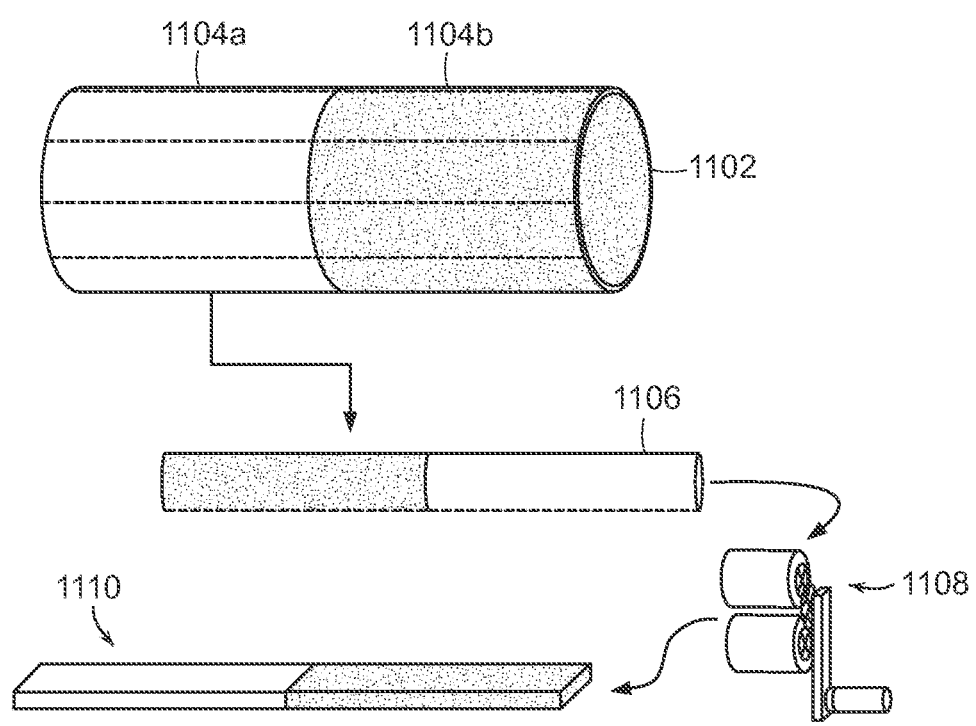
FIG. 21 is a diagram illustrating a process for producing bi-metallic buss bars.
Figure 22:
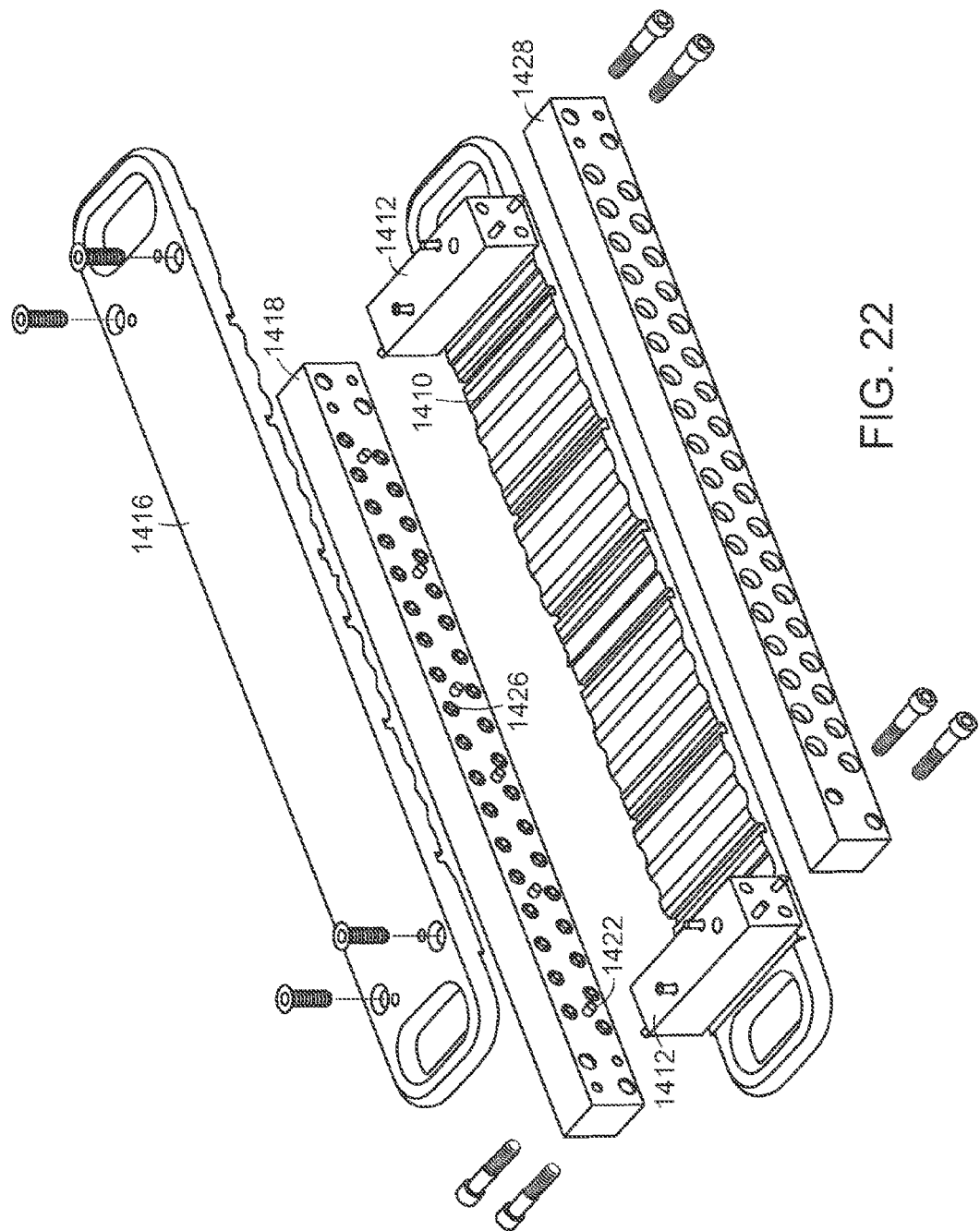
FIGS. 22-26 illustrate a fixture for retaining a cell module during a welding procedure, in accordance with exemplary embodiments of the invention.
Figure 23:
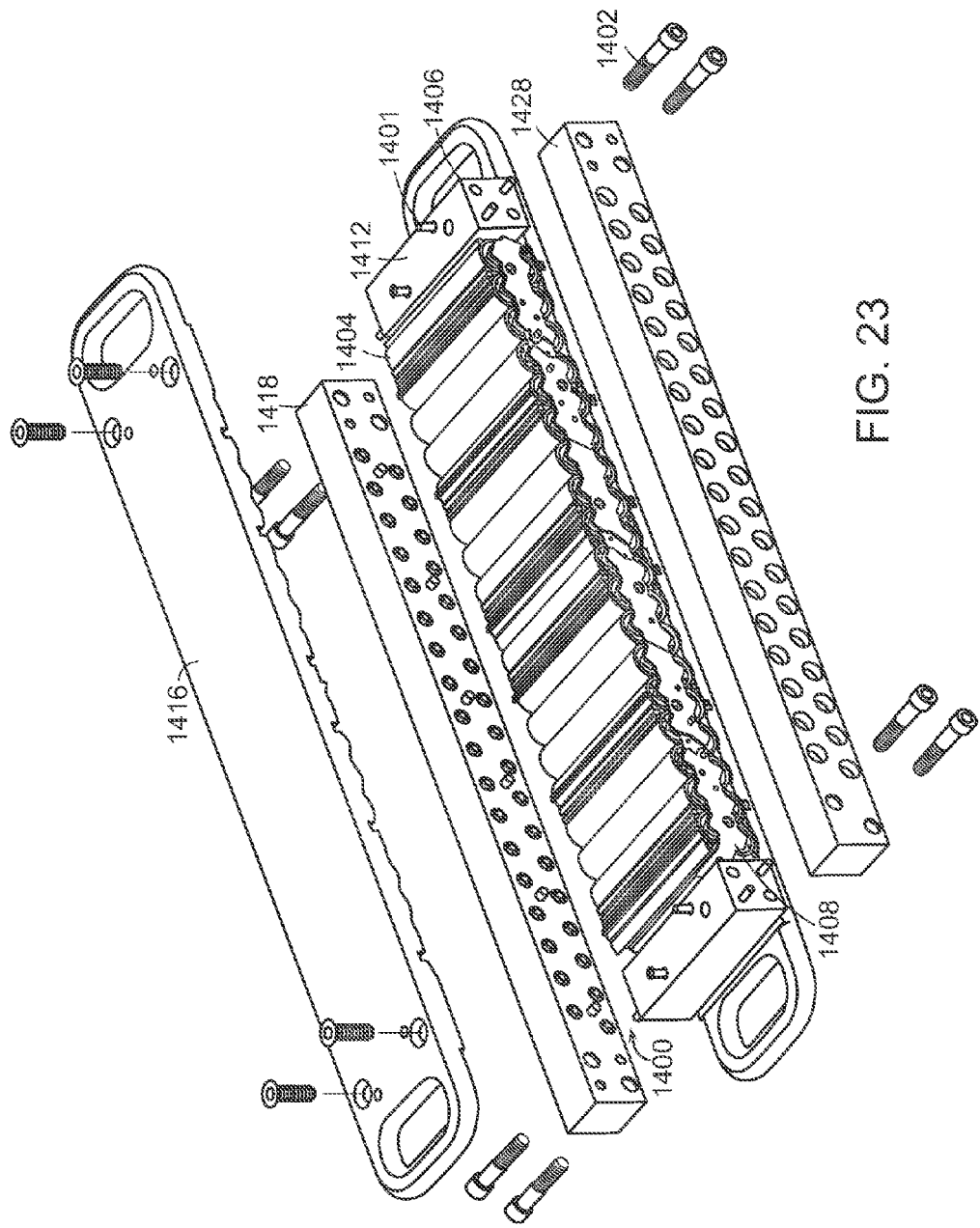
Figure 24:
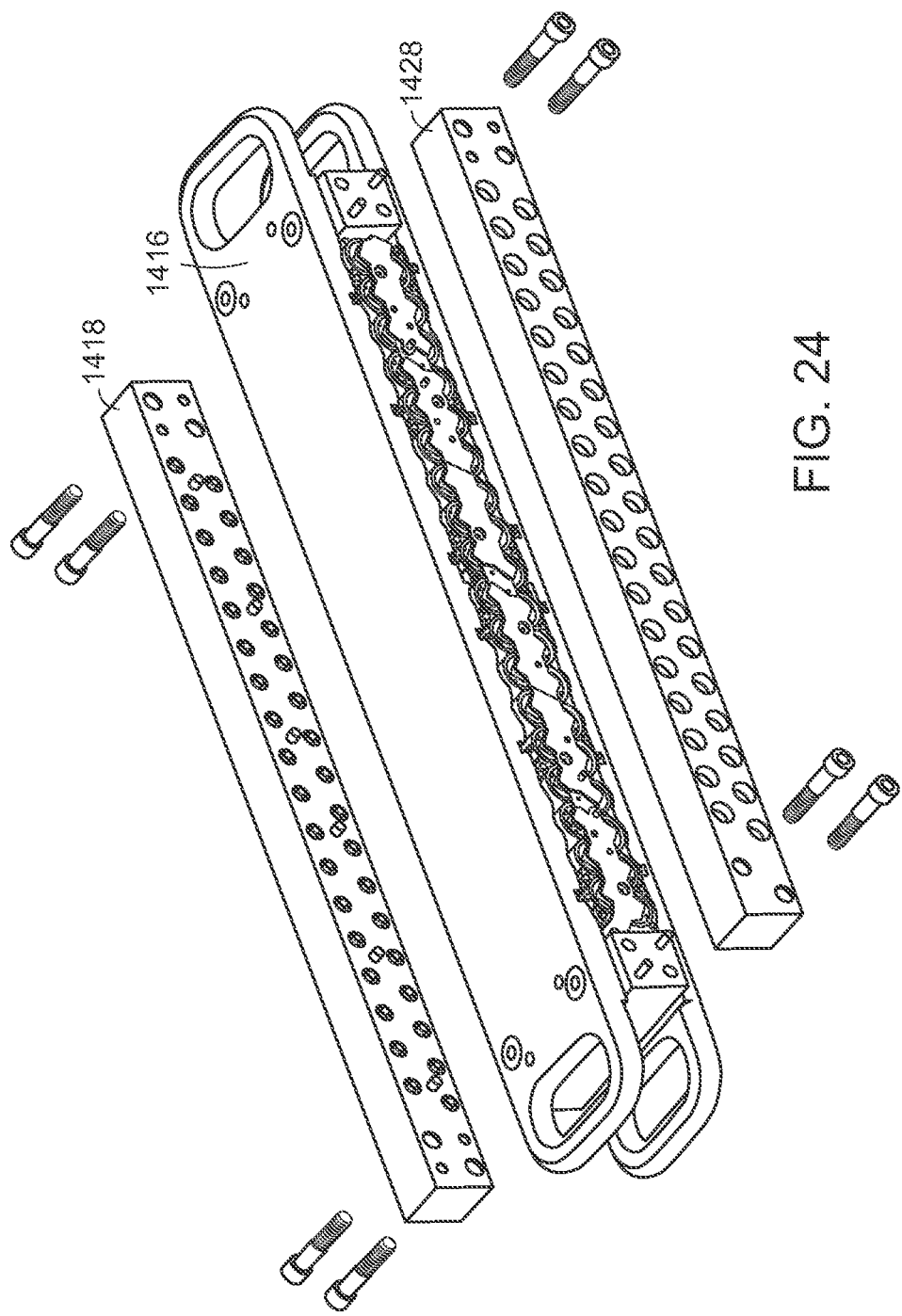
Figure 25:
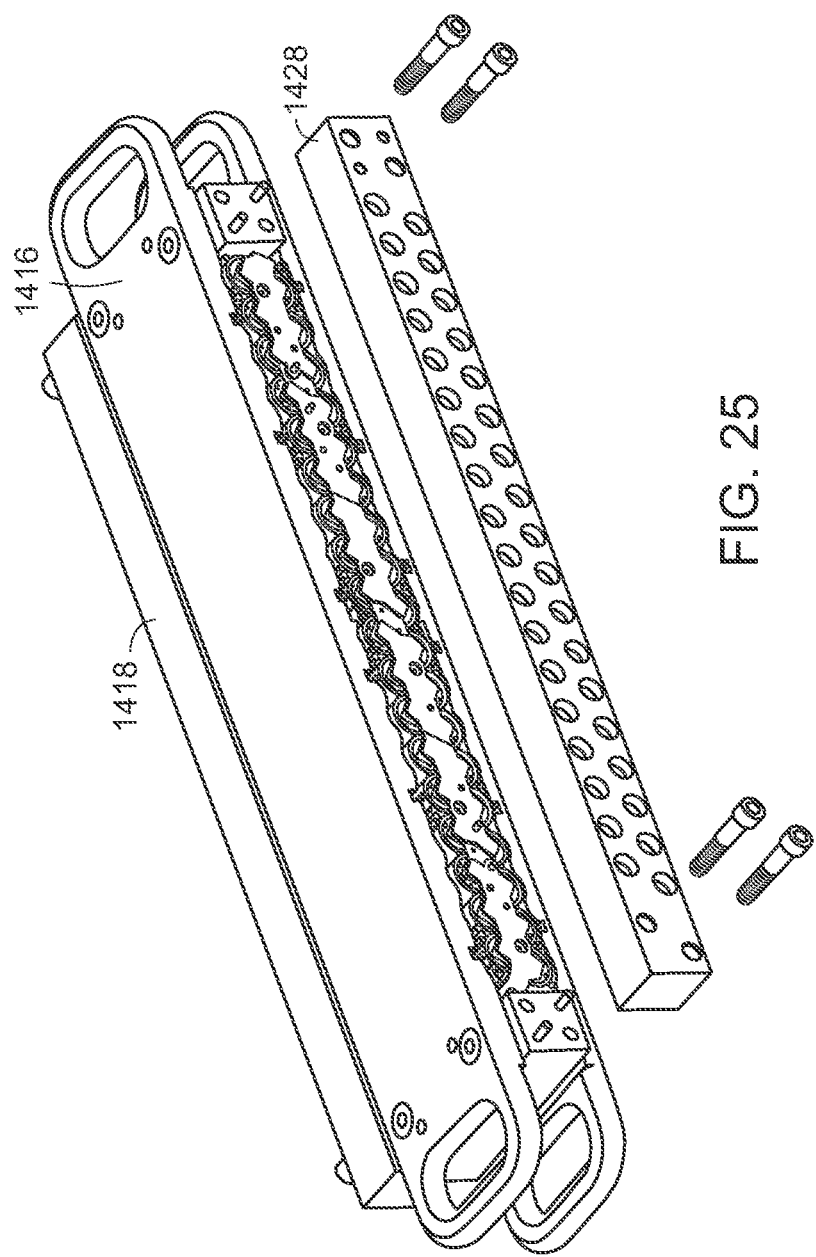

FIG. 21 is a diagram illustrating a process for producing bi-metallic buss bars for use in various embodiments of the present invention. First, a tube 1102 including a copper portion 1104a and an aluminum portion 1104b is created by friction welding the two different metals. Then, a tube section 1106 is cut from the tube 1102, and is rolled to provided a bi-metallic buss bar. Other methods known in the art for preparing a bi-metallic strip may be used to prepare a bi-metallic buss bar.

A battery cell typically may have a vent or vents (valves for releasing gas) at one or both ends of the battery cell. The vent emits hot expelled gas, for example, if the cell overheats. If the hot gas reaches the cover of the battery module without a reduction in temperature, it may damage the module. Embodiments of the present invention also provide battery modules having an efficient cell venting design.

FIGS. 22-26 illustrate a fixture that is used to laser weld the cell module's 1400 buss bars to the cell terminals. The cell terminals and buss bars may those described in the above embodiments. The fixture has four main subassemblies that are fastened together with locating pins 1401 and bolts 1402. The assembled fixture locates and grips and the module's cell case 1404, cells 1406, and buss bars 1408 during the laser welding process. In one embodiment, the fixture permits automatic laser welding with only one brief pause to manually flip the fixture via integral handles. The use of bolts 1402 is adequate to limit cost and complexity. For high-volume production, a similar fixture may be used with rapid-acting mechanisms rather than bolts to reduce the manufacturing process time.

The first main subassembly has a rigid land plate 1410 and two rigid gap blocks 1412 attached to the plate via locating pins, bolts, and dispensed thread locking adhesive. The land plate's 1410 material may be aluminum so that the fixture can be manually moved with a reasonable amount of effort. The land plate 1410 has many concave surfaces to locate and grip the module's cell case 1404. The gap block's 1412 material maybe fiberglass-reinforced plastic so that the risk of an accidental electrical short is prevented for the module's 1400 adjacent upper positive aluminum buss bar and upper negative copper buss bar at each end. The gap block 1412 has multiple plain and threaded holes to mate with the locating pins and bolts that retain the fixture's other three main subassemblies.

The second main subassembly has a rigid press plate 1416, which may be aluminum, with pins and bolts to retain it. The press plate 1416 is similar to the land plate 1410 except for the pattern of plain holes that mate with the gap block locating pins.

The third main subassembly has a rigid push bar 1418, which may be fiberglass-reinforced plastic, with pins and bolts to retain it. The push bar 1418 also has precision buss bar locating buttons 1422 that interface with the module's lower bi-metallic buss bars. The push bar 1418 also has spring-loaded plungers 1426 that press against the buss bars at every cell site to ensure a tight fit for each laser weld path.

Figure 26:
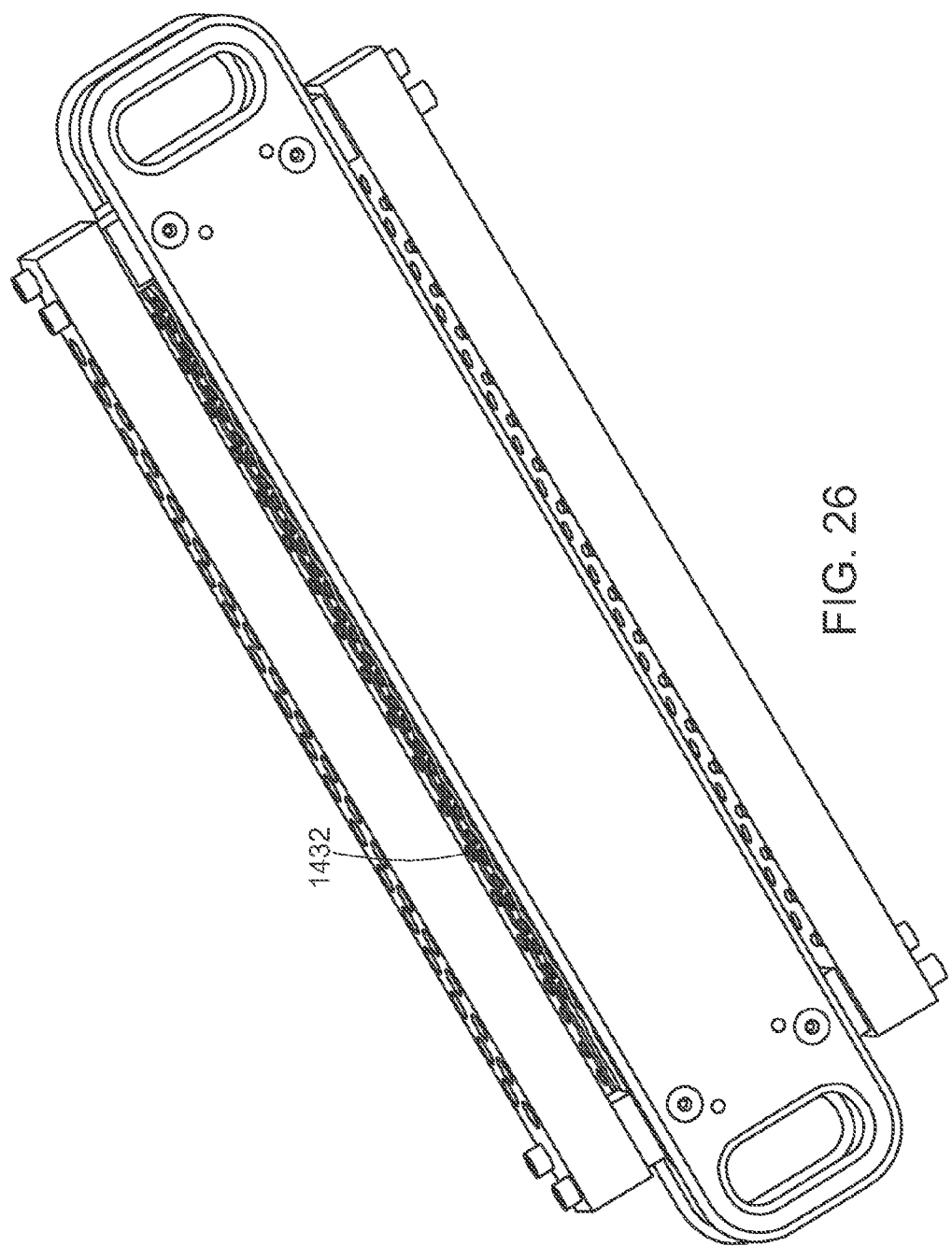

The fourth main subassembly has a rigid push bar 1428, which may be fiberglass-reinforced plastic, with pins and bolts to retain it. Similar to the push bar 1418, the push bar 1428 has precision buss bar locating buttons that interface with the module's upper positive aluminum buss bar, upper negative copper buss bar, and two upper bi-metallic buss bars. The push bar 1428 also has spring-loaded plungers that press against the buss bars at every cell site to ensure a tight fit for each laser weld path. The complete assembly is shown in FIG. 26, and includes an opening 1432 for entry of the welding laser.

Cells are often electrically connected in parallel within a battery module to increase overall battery system capacity. Some battery system applications require successful competition and passing of abuse testing which simulate defects that lead to internal cell shorting. Simulated shorts via cell nail puncture leads to cell temperature increase during rapid cell discharge within the cell. Paralleled cells further increase temperature due to the increased energy that needs to be discharged by the punctured cell. To prevent the energy from parallel cells from entering the punctured cell, a fuse may be placed in series with each of the parallel cells in order to interrupt the current during this condition.

Figure 27A:
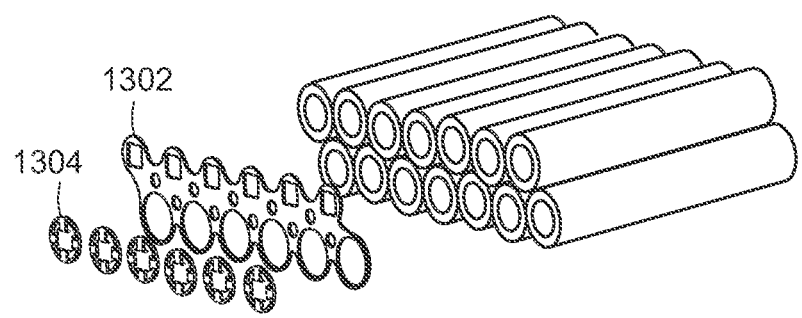
FIG. 27A is an exploded view of various components of a battery module including a buss bar and fuses.
Figure 27B:
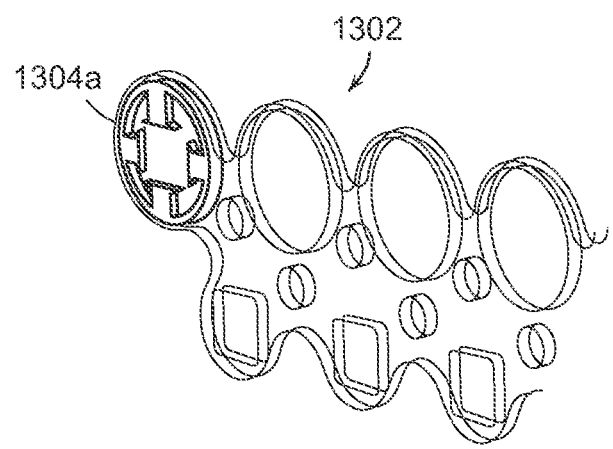
FIG. 27B is a diagram a buss bar and a fuse.
Figure 27C:
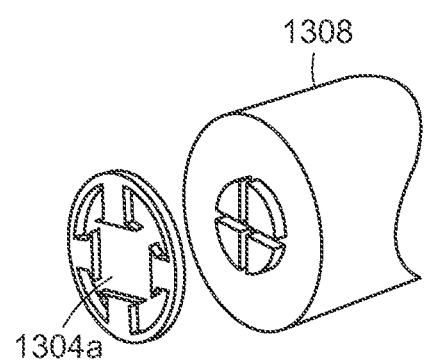
FIG. 27C is a diagram illustrating a fuse and a cell.

Embodiments of the present invention provide intrinsically safe and compact fusing for battery modules. In a battery module, a fuse can be applied to each cell, and the fuses can be located in the space between the nested cells. Alternatively, the fuses may be cut into the buss bar. FIG. 27A is an exploded view of various components of a battery module including a buss bar 1302 and fuses 1304; FIG. 27B is a diagram showing a buss bar 1302 and a fuse 1304*a*; and FIG. 27C is a diagram illustrating a fuse 1304*a* and a cell 1308.

Module packages in accordance with exemplary embodiments of the invention provide an effective utilization of cell space. Nesting cylindrical cells generates a triangular void between cells. The void may be used to house a fuse for each of the nested cells. A fuse encapsulated in the plastic cell housing provides an intrinsically safe environment that will help prevent a potentially combustible mixture within the battery module to ignite if a cell fuse opens. For example, for a cylindrical cell, the fuse may be located in a triangular void between nested cells. An intrinsically safe fusing method might also be a fuse cut into the electrical buss bar and encapsulated in such a way that it is in a sealed environment to prevent a spark from reaching potential combustible gasses within the module. The encapsulated buss bar may only cover the fusing portion while allowing for a welded or bolted connection to the cell terminal thus allowing for a compact design with good space utilization.

Numerous additional advantages or modifications may be realized by those having ordinary skill in the art. Accordingly, it is intended that the invention not be limited to the disclosed non-limiting embodiments but be interpreted within the full spirit and scope of the appended claims.

What is claimed:

1. A battery module comprising:
   a cell casing;
   a plurality of battery cells disposed within the cell casing, the battery cells each having its own terminal, the terminals having top and peripheral sides portions; and
   at least one buss bar segment that provides an electrical connection between a group of the battery cells, the at least one buss bar segment being extended across longitudinal ends of the group of battery cells to contact the tops of the terminals, and
   wherein the peripheral sides of the terminals are unobstructed by the at least one buss bar segment such that a laser can be pointed towards the peripheral sides to weld the terminals to the at least one buss bar segment, and
   wherein the terminals each comprise at least two peripheral sides, and the buss bar segment comprises protrusions that contact the terminals, each protrusion having a first side and a second side that are substantially aligned with the at least two peripheral sides of the respective terminals.

2. The battery module of claim 1, comprising a plurality of buss bar segments, each of the plurality of buss bar segments being spaced from each other in a direction extending along a row of the battery cells.

3. The battery module of claim 1, wherein the cell casing comprises an interlocking mechanism which is operative to couple the cell casing to an adjacent cell casing.

4. The battery module of claim 3, wherein the interlocking mechanism comprises at least one of a tab and a slot.

5. The battery module of claim 4, wherein the interlocking mechanism comprises a tab and a slot for respectively engaging with at least one of a slot and a tab of the adjacent cell casing.

6. The battery module of claim 1, wherein the group of battery cells comprises at least a first and second row, and the terminals have a circumferential shape with a plurality of corners, and wherein one of the corners of the terminals in the first row points away from the second row, and one of the corners of the terminals in the second row points away from the first row.

7. The battery module of claim 6, wherein the terminals have a square circumferential shape.

8. The battery module of claim 2, comprising a printed circuit board that monitors at least one of voltage and temperature of the battery module.

9. The battery module of claim 8, comprising a cover, wherein the printed circuit board extends along the plurality of buss bar segments between the cover and the plurality of buss bar segments.

10. The battery module of claim 2, wherein the plurality of buss bar segments form a first buss bar configuration, and the battery module comprises a second plurality of buss bar segments at another end of the battery cells that form a second buss bar configuration.

11. The battery module of claim 10, wherein the first buss bar configuration has a greater number of segments than the second buss bar configuration.

12. The battery module of claim 10, comprising a heat sink that cools the second buss bar configuration.

13. The battery module of claim 11, wherein the heat sink extends along the second buss bar configuration and comprises coolant inlets and outlets.

14. The battery module of claim 1, comprising a fuse configuration that respectively surrounds the terminals of the battery cells.

15. The battery module of claim 1, wherein the battery cells are disposed in a nested manner such that centers of adjacent battery cells form equilateral triangles.

16. The battery module of claim 1, wherein the battery cells are cylindrical lithium ion cells.

* * * * *